United States Patent
Nourai et al.

(10) Patent No.: US 10,846,912 B2
(45) Date of Patent: *Nov. 24, 2020

(54) GENERATING A NEW FRAME USING RENDERED CONTENT AND NON-RENDERED CONTENT FROM A PREVIOUS PERSPECTIVE

(71) Applicant: Magic Leap, Inc., Plantation, FL (US)

(72) Inventors: Reza Nourai, Danville, CA (US); Robert Blake Taylor, Porter Ranch, CA (US); Michael Harold Liebenow, Loxahatchee, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,809

(22) Filed: Oct. 21, 2019

(65) Prior Publication Data
US 2020/0051322 A1    Feb. 13, 2020

Related U.S. Application Data

(63) Continuation of application No. 16/120,020, filed on Aug. 31, 2018, now Pat. No. 10,489,966.

(60) Provisional application No. 62/553,778, filed on Sep. 1, 2017.

(51) Int. Cl.
| | |
|---|---|
| *G06T 15/20* | (2011.01) |
| *G06F 3/01* | (2006.01) |
| *G06T 3/00* | (2006.01) |
| *G06T 15/40* | (2011.01) |
| *G06T 1/60* | (2006.01) |

(52) U.S. Cl.
CPC .............. *G06T 15/20* (2013.01); *G06F 3/011* (2013.01); *G06F 3/012* (2013.01); *G06T 3/0093* (2013.01); *G06T 15/205* (2013.01); *G06T 15/40* (2013.01); *G06T 1/60* (2013.01); *G06T 2210/62* (2013.01)

(58) Field of Classification Search
None
See application file for complete search history.

(56) References Cited

U.S. PATENT DOCUMENTS

| | | |
|---|---|---|
| 9,417,452 B2 | 8/2016 | Schowengerdt et al. |
| 9,612,403 B2 | 4/2017 | Abovitz et al. |
| 2011/0090149 A1 | 4/2011 | Larsen et al. |
| 2011/0279446 A1 | 11/2011 | Castro et al. |
| 2013/0215115 A1 | 8/2013 | Jenkins |
| 2015/0235453 A1 | 8/2015 | Schowengerdt et al. |

(Continued)

OTHER PUBLICATIONS

PCT International Preliminary Report on Patentability for International Patent Appln. No. PCT/US2018/049266, Applicant Magic Leap, Inc., dated Mar. 3, 2020 (9 pages).

(Continued)

*Primary Examiner* — Vu Nguyen
(74) *Attorney, Agent, or Firm* — Vista IP Law Group LLP

(57) ABSTRACT

Disclosed is an approach for constructing a new frame using rendered content and non-rendered content from a previous perspective. Points of visible surfaces of a first set of objects from a first perspective are rendered. Both rendered content and non-rendered content from the first perspective are stored. The new frame from the second perspective is generated using the rendered content and the non-rendered content from the first perspective.

21 Claims, 40 Drawing Sheets

(56) References Cited

U.S. PATENT DOCUMENTS

2015/0294511 A1* 10/2015 Nishioka ............ H04N 5/23212
  345/420
2017/0018055 A1   1/2017 Holzer et al.

OTHER PUBLICATIONS

PCT International Search Report and Written Opinion for International Appln. No. PCT/US2018/049266, Applicant Magic Leap, Inc., forms PCT/ISA/210, 220, and 237, dated Nov. 9, 2018 (11 pages).
Extended European Search Report for EP Patent Appln. No. 18849933.9 dated Sep. 9, 2020.
Google Inc.: "Google Earth User Guide Table of Contents Introduction Getting to Know Google Earth, Five Cool, Easy Things You Can Do in Google Earth New Features in Version 4.0 Installing Google Earth System Requirements Changing Languages r Additional Support Selecting a Server Deactivating Go", May 8, 2007 (May 8, 2007), XP055726320, Retrieved from the Internet: URL:https://static.googleusercontent.com/media/earth.google.de/de/de/userguide/v4/google earth user guide.pdf [retrieved-on Aug. 31, 2020].

\* cited by examiner

GENERATING A NEW FRAME USING RENDERED CONTENT AND NON-RENDERED CONTENT FROM A PREVIOUS PERSPECTIVE

CROSS-REFERENCE TO RELATED APPLICATIONS

The present application is a continuation of U.S. patent application Ser. No. 16/120,020, filed on Aug. 31, 2018, which claims the benefit of priority to U.S. Provisional Application No. 62/553,778, filed on Sep. 1, 2017. The contents of these patent applications are hereby incorporated by reference in their entirety as though set forth in full.

FIELD OF THE INVENTION

The present disclosure generally relates to constructing a new perspective of an image by using image data for non-rendered content from a previous frame without regenerating the image from the new perspective.

BACKGROUND

Modern computing and display technologies have facilitated the development of systems for so-called "virtual reality" (VR) or "augmented reality" (AR) experiences, where digitally reproduced images or portions thereof are presented to a user in a manner where they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the real world around the user.

VR and AR systems typically employ wearable display devices (e.g., head-worn displays, helmet-mounted displays, or smart glasses) that are at least loosely coupled to the user's head, and thus move when the user's head moves. If the user's head motions are detected by a display system, image data being displayed can be updated to take into account the change in head pose (i.e., the orientation and/or location of user's head).

As an example, if a user wearing a head-worn display views a representation of a three-dimensional (3D) object as an image on the display and walks around an area where the 3D object appears, that 3D object can be regenerated from each additional viewpoint, giving the user the perception that they are walking around the 3D object. If the head-worn display is used to present a scene including multiple 3D objects within a virtual space (e.g., a rich virtual world), measurements of head pose can be used to regenerate the scene to match the user's dynamically changing head location and orientation and provide an increased sense of immersion in the virtual space.

Typically, a display imposes a color data fidelity or resolution on how color information is presented. Within the resolution, only one color value per pixel can be present, regardless of how many photonic events may correspond to an angular position from a user's point of view or perspective. In a case of opaque content, only a result of a closest photonic event (e.g., a closest opaque object to the user) is kept resulting in the total loss of data related to occluded events (e.g., opaque objects and/or semi-transparent objects behind the opaque object). In a case of semi-transparent content, results from photonic events (e.g., semi-transparent object and opaque objects and/or semi-transparent objects behind the semi-transparent object) are blended. In either case, if only one color value per pixel can be present, it becomes difficult to reconstruct and separate original photonic event data (e.g., semi-transparent objects and/or opaque objects) which makes it difficult to warp positions of those events correctly if each event should be moved to a different location during the warp. For example, if photonic events e0 and e1 have been blended to produce pixel p0, during warping a solution may be to move photonic event e0 to pixel p1 and photonic event e1 to pixel p2, but because the input to warping is the merge result (e.g., pixel p0), the merged pixel must be moved in its entirety to either pixel p1 or pixel p2 and cannot be split out back into its original photonic events e0 and e1 to perform the warping correctly and move photonic event e0 to pixel p1 and photonic event e1 to pixel p2 as desired.

For each frame, only image data corresponding to points of visible surfaces of objects are kept (i.e., rendered) and is referred to as "rendered content," and image data corresponding to points of non-visible surfaces of the objects is discarded (i.e., not rendered) and is referred to as "non-rendered content." However, when the user moves their head to a new perspective, the user may be expecting to see points of surfaces of the object that were previously non-visible. As explained in further detail below, any non-rendered content is lost when the user moves to a new perspective because the application has kept only rendered content from a previous scene. This means that when the VR and AR systems display different perspectives, each additional scene needs to be regenerated from each new perspective to accurately depict each scene with correct locations and orientations for the points of surfaces of the objects.

"Warping" may be applied to change the way that objects are presented in a new scene. This approach takes objects, and shifts the way that points of surfaces of the objects are presented in an attempt to display the objects from a different perspective. However, a disocclusion problem occurs when some objects are at least partially covering other objects. In one example, a frame including image data is rendered from a first perspective, where the rendered frame includes displayable information of a first object and a second object from the first perspective and does not include displayable information of the first object and the second object from a second perspective. Rendered content corresponding to displayable information for the first and second objects from the first perspective is captured and stored. Non-rendered content corresponding to displayable information for the first and second objects from the second perspective is not captured or stored when the frame is rendered from the first perspective. This becomes problematic when the user moves to a new position because different portions of the first object and the second object may be viewable from the second perspective, but warped content only includes portions of the first and second objects viewable from the first perspective. The warped content will be missing content for the first and second objects that were not visible in the first perspective but that are now visible from the second perspective (no matter how much warping is applied). This approach therefore creates a significant amount of video artifacts that affect the content veracity of the image from different perspectives.

Therefore, there is a need for an approach to display a new perspective of an image by using image data for non-rendered content from a previously rendered image without regenerating the image from the new perspective.

SUMMARY

In accordance with some embodiments, instead of re-rendering objects to display an additional perspective of the objects, the objects from the additional perspective are constructed from rendered content and/or non-rendered content from a previous frame. The content from the previous frame may be selected and stored by various approaches. In one embodiment, all content is stored. In one embodiment, content corresponding to surface points is stored. In another embodiment, content corresponding to a realistic range of head movement is stored. In another embodiment, content corresponding to the nearest visible opaque points and all semi-transparent points in front of the nearest visible opaque points is stored. In some embodiments, content is stored as a linked list, a voxel, surface definitions (e.g., shells, curves, and the like), N-dimensional data structures or graph representation thereof, and the like.

Additional and other objects, features, and advantages of the disclosure are described in the detail description, figures and claims.

BRIEF DESCRIPTION OF THE DRAWINGS

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

DETAILED DESCRIPTION

The present disclosure is directed to an approach to construct a new perspective of an image by using non-rendered content from a previous frame. Instead of regenerating the image from the new perspective, the image is constructed from a previous perspective using non-rendered content from the previous perspective to create the new perspective.

This disclosure provides a description of an illustrative augmented reality (AR) system with which some embodiments of the disclosure may be practiced, followed by a description of one or more embodiments of a process and mechanism to display a second perspective of an image using non-rendered content from a first perspective.

Illustrative Augmented Reality System

The description that follows pertains to an illustrative AR system with which the disclosure may be practiced. However, it is to be understood that the disclosure also lends itself to applications in other types of AR and virtual reality (VR) systems, and therefore the disclosure is not to be limited to only the illustrative system disclosed herein.

Figure 1:
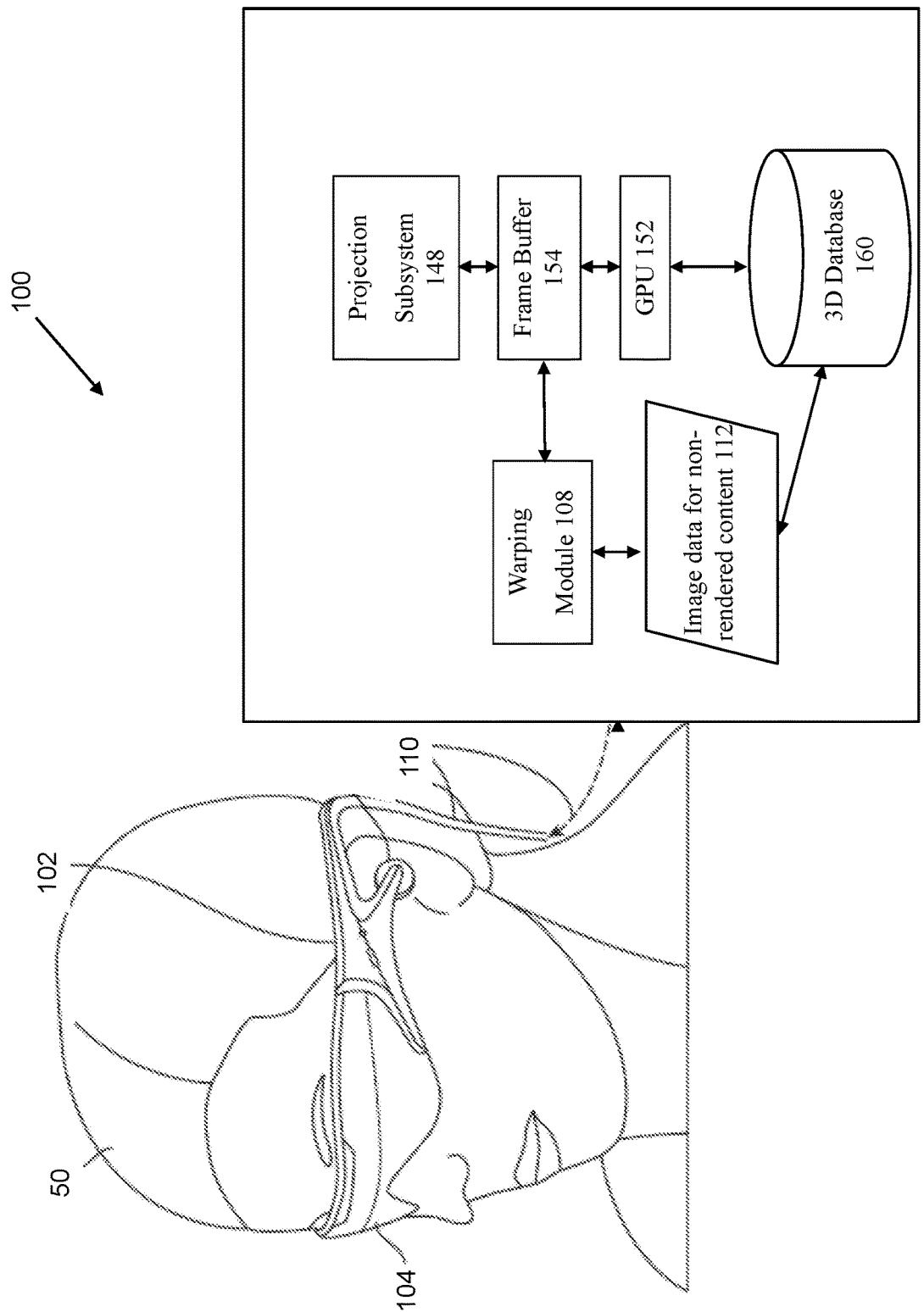
FIG. 1 shows an example system architecture of an image generation system, according to one embodiment.

Referring to FIG. 1, one embodiment of an AR system 100 constructed in accordance with present disclosure is described. The AR system 100 may be operated in conjunction with an AR subsystem, providing images of objects in a field of view of an end user 50 (hereinafter referred to as "user 50"). This approach employs one or more at least partially transparent surfaces through which an ambient environment can be seen and on to which the AR system 100 produces images of objects.

The AR system 100 includes a frame structure 102 worn by the user 50, a display system 104 carried by the frame structure 102, such that the display system 104 is positioned in front of eyes of the user 50.

The display system 104 is designed to present the eyes of the user 50 with photo-based radiation patterns that can be comfortably perceived as augmentations to physical reality with both two-dimensional and three-dimensional content. The display system 104 presents a sequence of frames at high frequency that provides the perception of a single coherent scene. To this end, the display system 104 includes a projection subsystem 110 and a partially transparent display screen on which the projection subsystem 110 projects images. The display screen is positioned in the user's 50 field of view between the eyes of the user 50 and an ambient environment.

In some embodiments, the projection subsystem 110 takes the form of a scan-based projection device and the display screen takes the form of a waveguide-based display into which scanned light from the projection subsystem 110 is injected to produce, for example, images at a single optical viewing distance closer than infinity (e.g., arm's length), images at multiple optical viewing distances or focal planes, and/or image layers stacked at multiple viewing distances or focal planes to represent volumetric 3D objects. Layers in a light field may be stacked closely enough together to appear continuous to a human visual subsystem (e.g., one layer is within a cone of confusion of an adjacent layer). Additionally, or alternatively, picture elements may be blended across two or more layers to increase perceived continuity of transition between layers in the light field, even if those layers are more sparsely stacked (e.g., one layer is outside a cone of confusion of an adjacent layer). The display system 104 may be monocular or binocular. A scanning assembly includes one or more light sources that produce light beam (e.g., emit light of different colors in defined patterns). The light sources may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. An optical coupling subsystem includes an optical waveguide input apparatus, such as, for example, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in a center of the optical waveguide input apparatus, thereby allowing the size of the optical waveguide input apparatus to be minimized. Thus, the display system 104 generates a series of synthetic image frames of pixel information that present an undistorted image of one or more virtual objects to the user. Further details describing display subsystems are provided in U.S. Pat. No. 9,417,452, issued on Aug. 16, 2016, entitled "Display System and Method," and U.S. Pat. No. 9,612,403, issued on Apr. 4, 2017, entitled "Planar Waveguide Apparatus with Diffraction Element(s) and Subsystem Employing Same," which are expressly incorporated herein by reference.

The AR system 100 further includes one or more sensors mounted to the frame structure 102 for detecting a position and movement of a head of the user 50 and/or eye position and inter-ocular distance of the user 50. Such sensor(s) may include image capture devices, microphones, inertial measurement units (IMUs), accelerometers, compasses, GPS units, radio devices, and/or gyros. For example, in one embodiment, the AR system 100 includes a head worn transducer subsystem that includes one or more inertial transducers to capture inertial measures indicative of movement of the head of the user 50. Such devices may be used to sense, measure, or collect information about the head movements of the user 50. For instance, these devices may be used to detect measurement movements, speeds, acceleration, and/or positions of the head of the user 50.

The AR system 100 may further include a user orientation detection module. The user orientation detection module detects the instantaneous position of the head of the user 50 and may predict the position of the head of the user 50 based on position data received from the sensor(s). The user orientation detection module also tracks the eyes of the user 50, and, in particular, the direction and/or distance at which the user 50 is focused based on the tracking data received from the sensor(s).

The system 100 also includes a warping module 108. The warping module 108 selects image data corresponding to points of non-visible surfaces of objects from a first perspective and stores the selected image data in a 3D database 160. The image data corresponding to the non-visible surfaces is referred to as "non-rendered content" 112. The warping module 108 also retrieves the image data from the 3D database 160 when constructing an image from a second perspective using the stored image data.

The AR system 100 further includes a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem may include a digital signal processor (DSP), a central processing unit (CPU), a graphics processing unit (GPU) 152, and one or more frame buffers 154. The CPU controls overall operation of the system, while the GPU 152 renders frames (i.e., translating a three-dimensional scene into a two-dimensional image) and stores these frames in the frame buffer(s) 154. While not illustrated, one or more additional integrated circuits may control the reading into and/or reading out of frames from the frame buffer(s) 154 and operation of the scanning device of the display system 104. Reading into and/or out of the frame buffer(s) 154 may employ dynamic addressing, for instance, where frames are over-rendered. The AR system 100 further includes a read only memory (ROM) and a random-access memory (RAM). The AR system 100 further includes the 3D database 160 from which the GPU 152 can access image data of one or more scenes for rendering frames, as well as synthetic sound data associated with virtual sound sources contained within the 3D scenes.

The various processing components of the AR system 100 may be physically contained in a distributed subsystem. For example, the AR system 100 includes a local processing and data module operatively coupled, such as by a wired lead or wireless connectivity, to a portion of the display system 104. The local processing and data module may be mounted in a variety of configurations, such as fixedly attached to the frame structure 102, fixedly attached to a helmet or hat, embedded in headphones, removably attached to a torso of the user 50, or removably attached to a hip of the user 50 in a belt-coupling style configuration. The AR system 100 further includes a remote processing module and remote data repository operatively coupled, such as by a wired lead or wireless connectivity to the local processing and data module, such that these remote modules are operatively coupled to each other and available as resources to the local processing and data module. The local processing and data module may include a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 104 after such processing or retrieval. The remote processing module may include one or more relatively powerful processors or controllers configured to analyze and process data and/or image information. The remote data repository may include a relatively large-scale digital data storage facility, which may be available through the internet or other networking configuration in a "cloud" resource configuration. In one embodiment, all data is stored and all computations are performed in the local processing and data module, allowing fully autonomous use from any remote modules. The couplings between the various components described above may include one or more wired interfaces or ports for providing wires or optical communications, or one or more wireless interfaces or ports, such as via radio frequency (RF), microwave, and infrared (IR) for providing wireless communications. In some implementations, all communications may be wired, while in other implementations all communications may be wireless, with the exception of the optical fiber(s).

Constructing a Second Image From a Different Perspective With Non-Rendered Image Data The disclosure will now discuss constructing a new perspective of an image by using non-rendered content from a previous frame. "Warping" may be applied to change the way that objects in a previous frame generated from previous perspective are presented in a new frame generated from a new perspective without regenerating the objects from the new perspective. The objects from the new perspective are constructed from the content from the previous frame.

It is instructive at this point to first discuss an alternative approach for warping images. In this alternative approach, for each frame, image data corresponding to points of visible surfaces of objects are kept (i.e., rendered) and is referred to as "rendered content," and image data corresponding to points of non-visible surfaces of the objects is discarded (i.e., not rendered) and is referred to as "non-rendered content." As such, a new frame from a new perspective (e.g., second perspective) cannot be accurately displayed with just warping a previous frame from a previous perspective (e.g., first perspective) without additional regenerating due to the fact that objects are rendered from the previous perspective of the user's eyes, where only rendered content—the image data corresponding to points of visible surfaces of the objects from the previous perspective—are kept. FIGS. 2A-F provide an illustration of the alternative approach and the resulting problem.

Figure 2A:
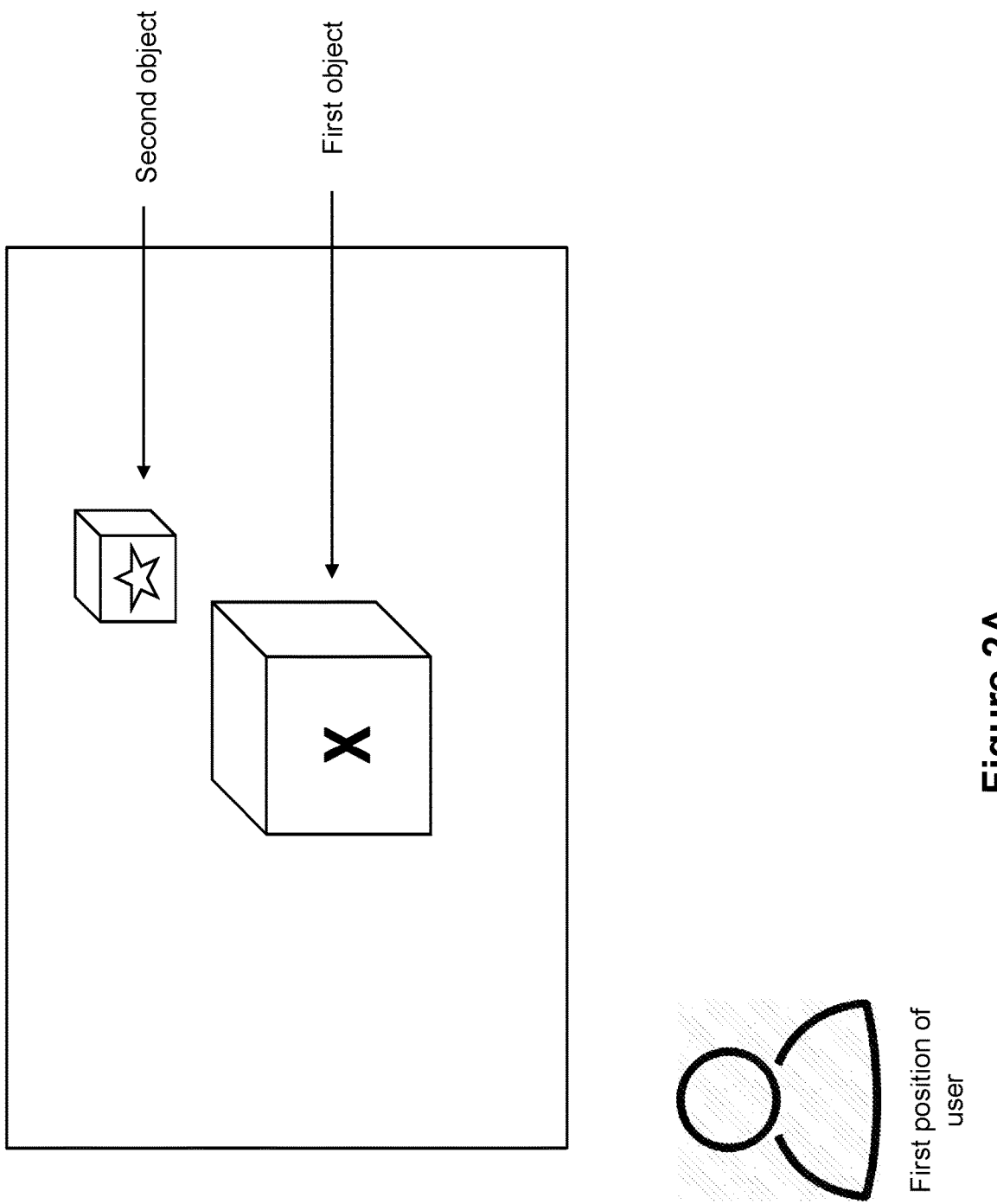
FIGS. 2A-2F show displaying a second perspective of an image using content from a first perspective, according to one embodiment.

FIG. 2A shows a user (e.g., user 50) and a scene including a first object and a second object. The user is located in a first position. Each of the two objects are shaped as a regular block/cube, with a letter "X" on a front face of the first object and a star on a front face of the second object.

Figure 2B:
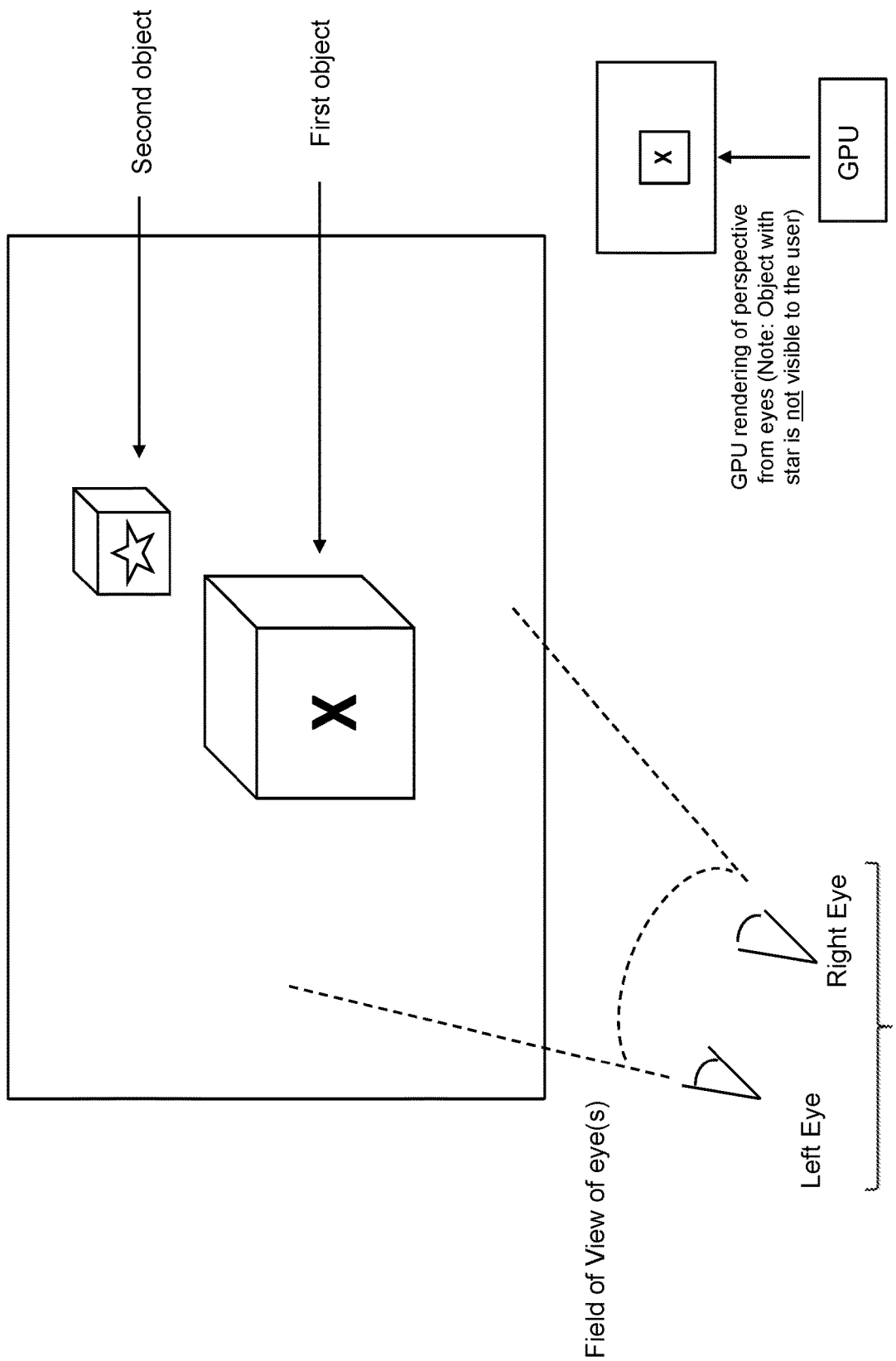

The eyes of the user may be located at a location and angular position as shown in FIG. 2B. The particular location and angular position of the eyes of the user will be referred to as a first perspective. In the first perspective, the eyes of the user are looking at the first and second objects from an angle such that the first object is completely blocking the second object. A GPU (e.g., the GPU 152) renders a frame including an image of the scene from the first perspective. Even though the second object is in the scene, the image of the scene will be rendered showing only the front face of the first object—without any other faces of the first object or any faces of the second object being rendered because, from the first perspective, only the front face of the first object is visible to the user.

Figure 2C:
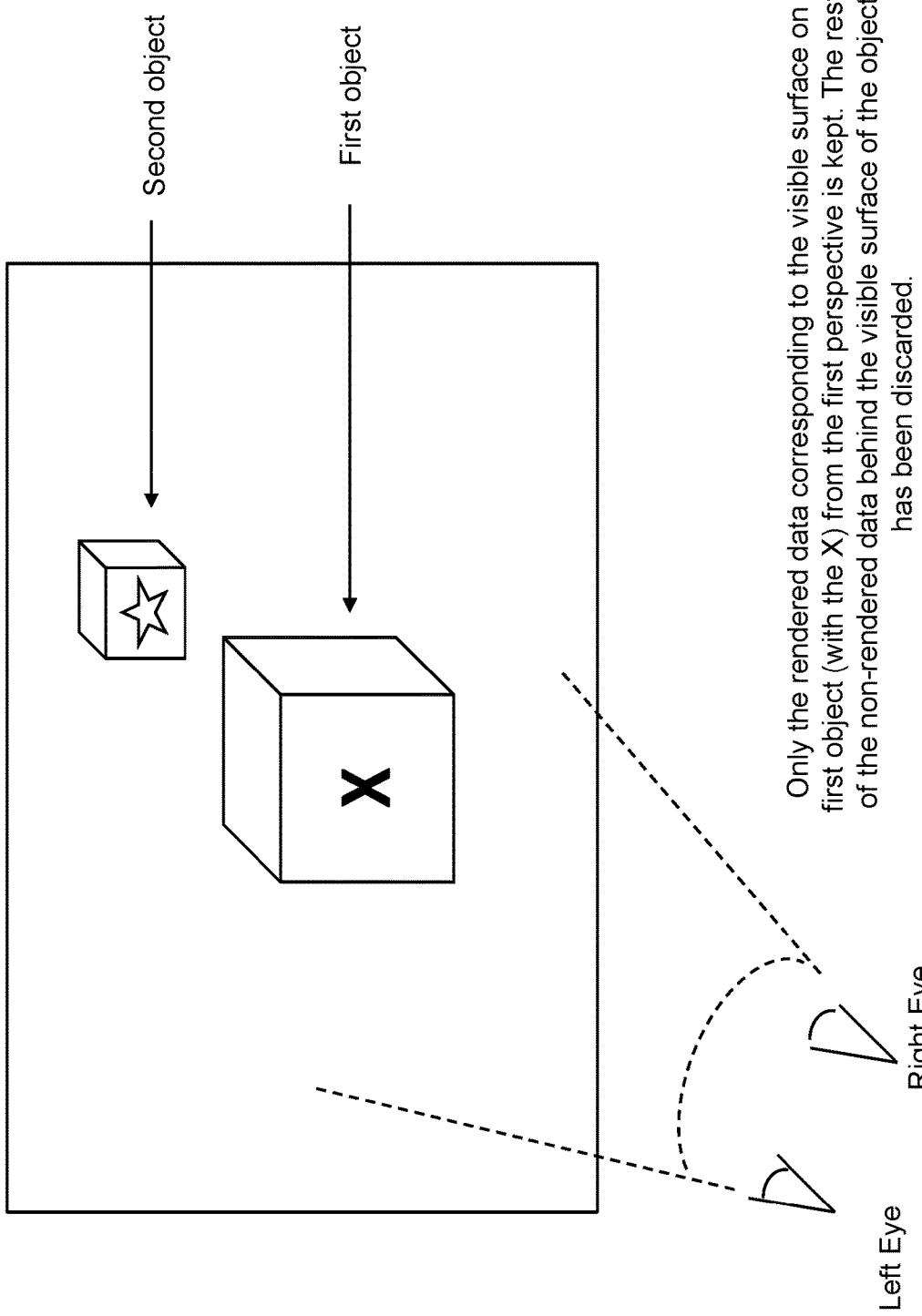

The frame including the image of the scene from the first perspective is rendered. The frame includes image data. As shown in FIG. 2C, only image data corresponding to the points of the visible surfaces of the first and second objects (i.e., the front face of the first object) from the first perspective are kept/stored. The image data corresponding to the points of the visible surfaces is referred to as "rendered content." The image data corresponding to the points of non-visible surfaces of the first and second objects (e.g., all faces of the first object except for the front face and all faces of the second cube) from the first perspective are discarded. The image data corresponding to the non-visible surfaces of the first and second objects is referred to as "non-rendered content." Other than the rendered content, the application has lost other content (e.g., the non-rendered content) for the first perspective. In some embodiments, the non-rendered content may be discarded during depth testing. Depth testing ensures that the rendered content looks correct by making sure that only the points of the visible surfaces of the first and second objects are drawn in the frame including the image of the scene. For any given pixel, depth testing keeps only the points of the visible surfaces of the first and second objects and discards the points of the non-visible surfaces of the first and second objects. As such, the application has lost context from the first perspective by discarding non-rendered content. Thus, for each pixel, what is kept and what is discarded is perspective dependent.

Figure 2D:
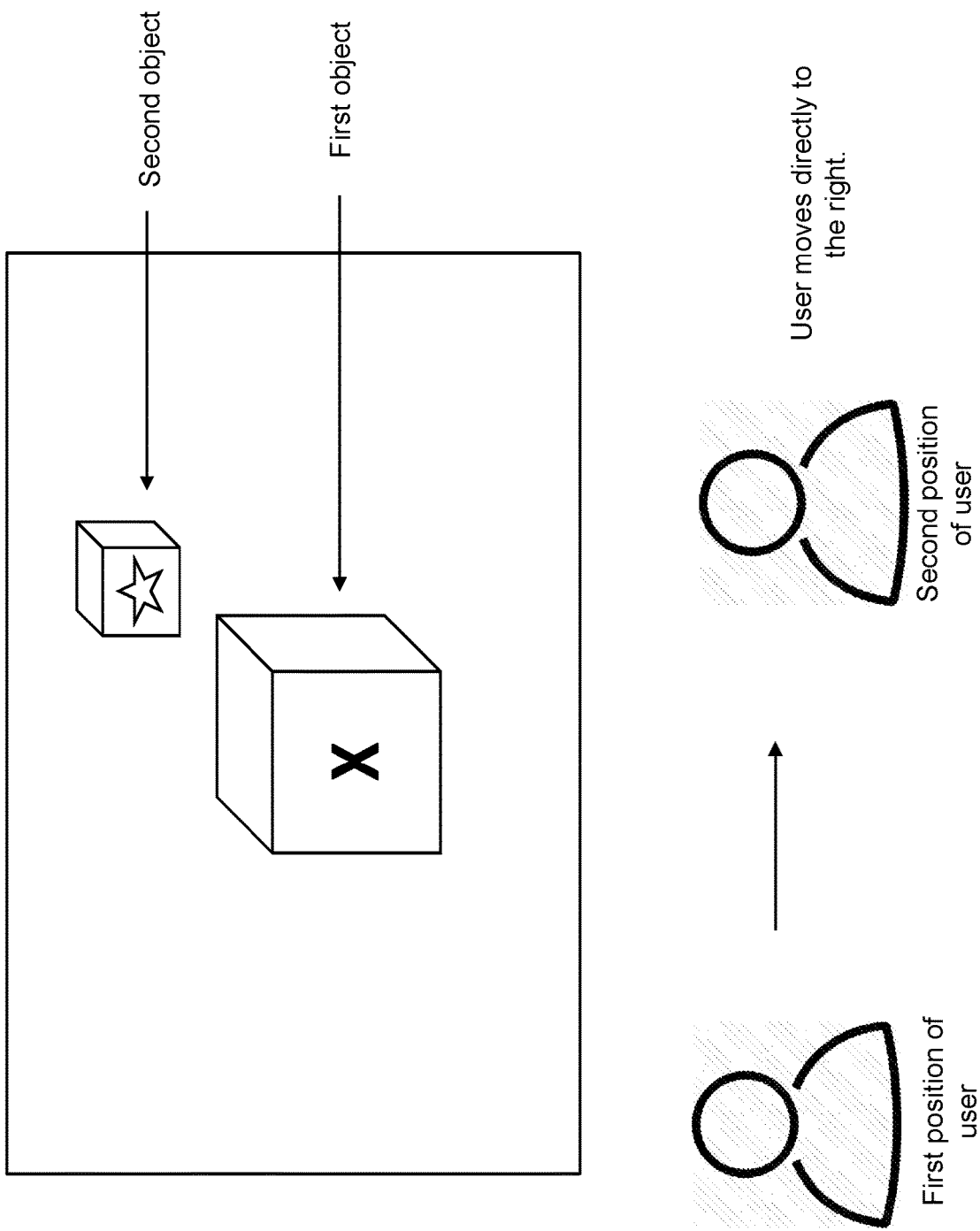

As shown in FIG. 2D, the user now moves to a second position directly to the right of the first position. At this point, the user will be looking at the first and second objects from a different position as compared to the first position.

Figure 2E:
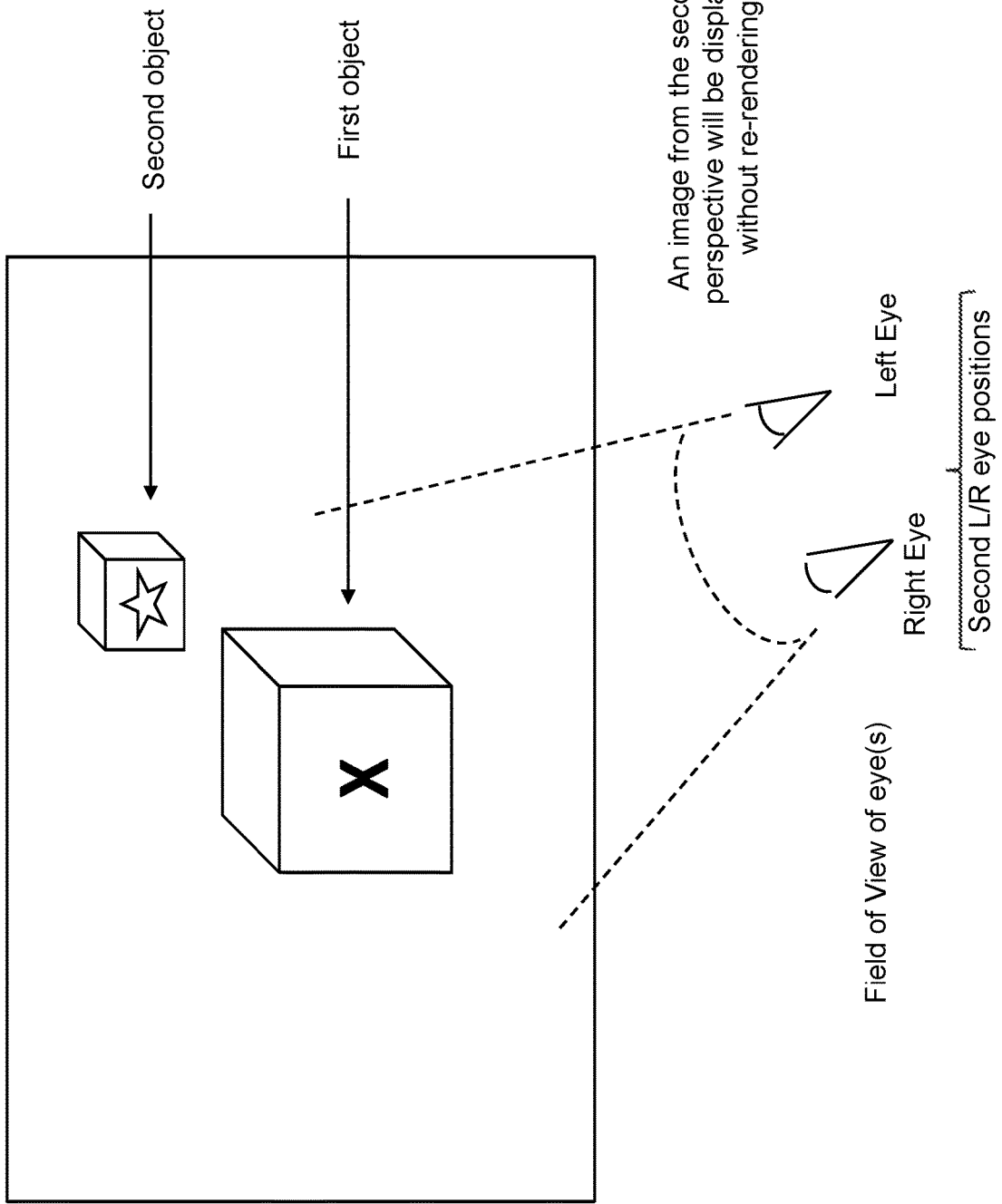

The eyes of the user may be located at a location and angular position shown in FIG. 2E. The particular location and angular position of the eyes of the user will be referred to as a second perspective. In the second perspective, the eyes of the user should see a frame that is different than the frame from the first perspective. In the second perspective, the eyes of the user should be seeing both the front and right faces of the first object and the front and right faces of the second object.

Figure 2F:
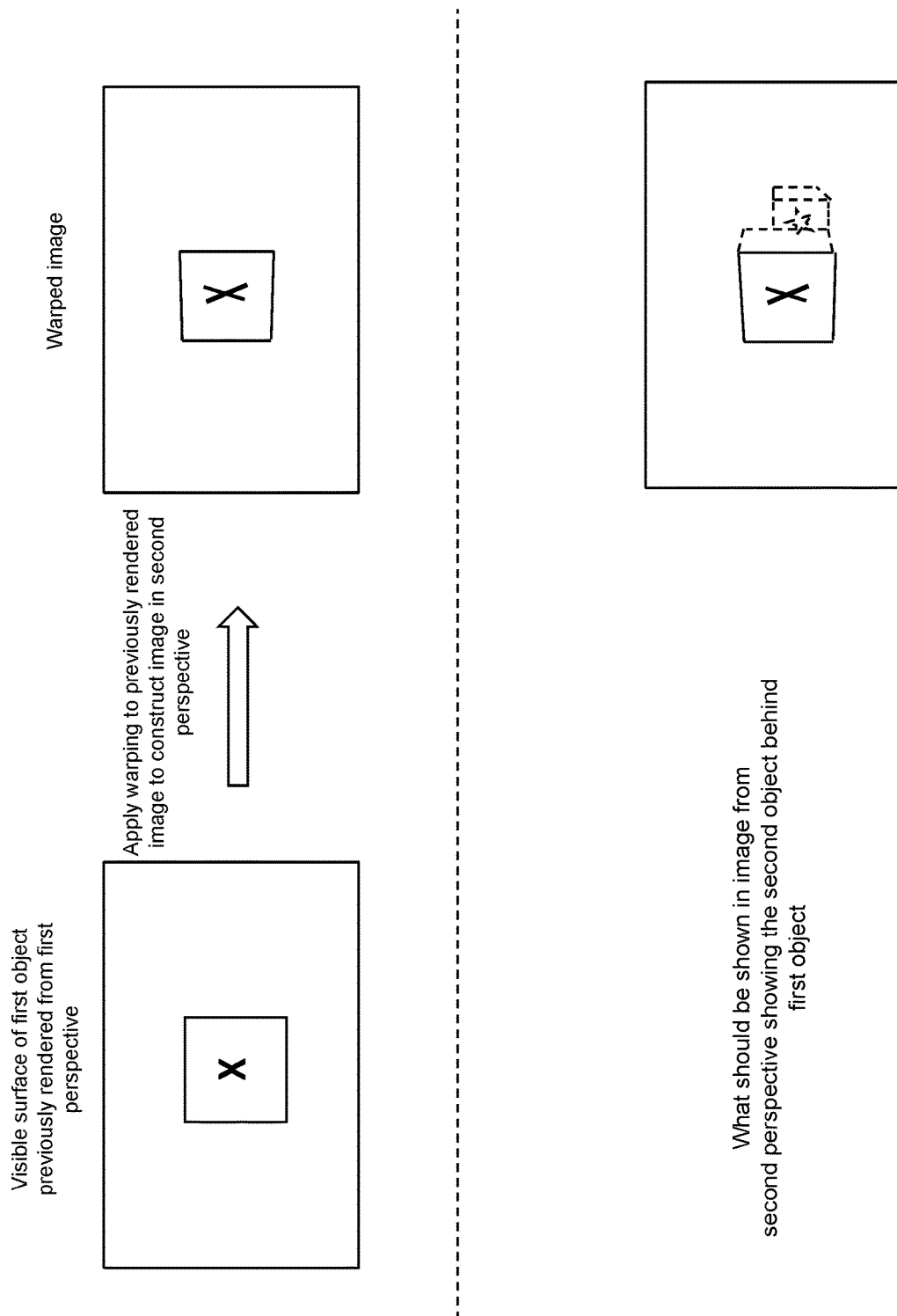

As shown in FIG. 2F, warping may be used to change the previous frame from the first perspective so that it is shown in a new frame from the second perspective. This approach takes the rendered content of the image of the previous frame from the first perspective, and shifts the way that the rendered content is presented to attempt to display the rendered content from the second perspective. The rendered content from the previous frame includes image data corresponding to the points of the visible surfaces of the first and second objects from the first perspective. One problem with this approach is that the rendered content from the previous frame does not include image data corresponding to points of surfaces of the first and second objects visible from the second perspective. In this example, the previous frame was generated from the first perspective, which means the rendered content does not include image data corresponding to the points of non-visible surfaces of the first and second objects.

Therefore, even if warping is applied, only the front face of the first object (which was previously rendered) will be seen in the warped image. All of other faces of the first object (except for the front face) and all faces of the second object will not exist in the warped image since they were not previously rendered. As such, the warped image is missing content that should have been viewable from the second perspective (e.g., the missing content includes the right face of the first object and the front and right faces of the second object) since a viewing perspective (i.e., the second perspective) of the second position is different from a viewing perspective (e.g., the first perspective) of the first position. This creates a number of artifacts that affect the usability and accuracy of the new frame.

The problem is illustrated in FIG. 2F, where warping is applied to the rendered content from the previous frame from the first perspective to construct the new frame from the second perspective without regenerating. This causes an inaccurate display from the second perspective. In particular, the disocclusion problem occurs because the new frame from the second perspective is missing right face of the first object and the entirety of the second object. As such, when the user views the previous frame from a different perspective (i.e., the second perspective), the application is mapping the rendered content from the previous frame into new locations. However, because the non-rendered content from the previous frame is already discarded, there is no "source data" to use in place of (e.g., using rendered content and non-rendered content) or in addition to warping. As such, the application only maps the rendered content from the previous frame. Applying a construction using only rendered content from the previous frame from the first perspective to construct the new frame from the second perspective results in an inaccurate depiction from the second perspective because the application discarded the non-rendered content from the first perspective—which means that the application has lost image data for the non-visible surfaces earlier. Contrast the frame generated at the top of FIG. 2F with the frame of what should have been shown from the second perspective in the bottom of FIG. 2F.

The specification will now describe an approach that solves the problematic result from the alternative approach described in FIGS. 2A-2F.

Figure 3:
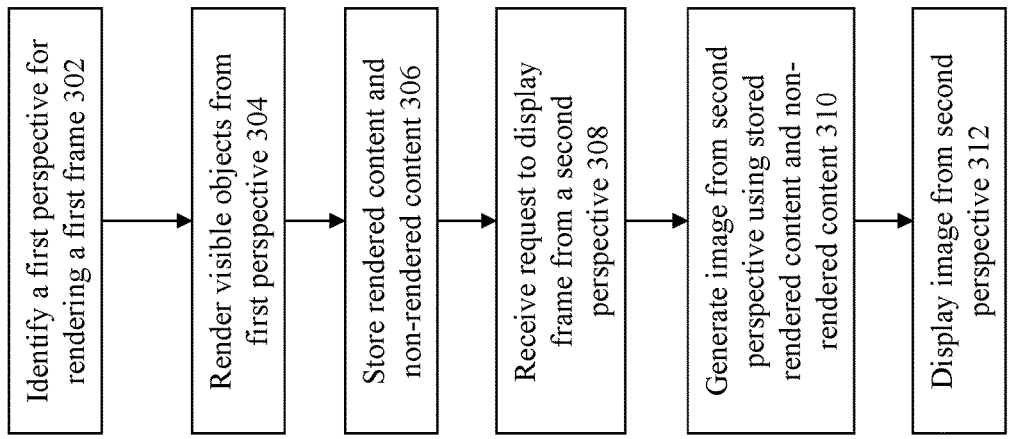
FIG. 3 shows a flowchart for an approach for displaying a second perspective of an image using content from a first perspective, according to one embodiment.

Displaying a Second Perspective Using Image Data for Rendered Content and Non-Rendered Content by Generating FIG. 3 shows a flowchart of an approach to display a new frame from a new perspective using rendered content and non-rendered content from a previous frame from a previous perspective without regenerating. The approach described in FIG. 3 solves the disocclusion problem presented in the earlier alternative embodiment.

At 302, a first perspective is identified. In some embodiments, this action is implemented by capturing a frame including image data that is captured from a first perspective. In some embodiments, pose data is also captured. The frame is recorded by capturing the frame of the image data from the first perspective—the particular location and angular position of eyes of a user (e.g., the user 50). In addition, the pose data for the user's head/eyes is determined. If a camera from which the frame is captured is mounted to a frame structure (e.g., frame structure 102), then camera pose may be extrapolated based upon a known offset from a head pose. If the camera is at a fixed location within an environment/room, then the fixed camera location and orientation is known from the room/environment configuration data.

At 304, image data corresponding to points of visible surfaces of objects from the first perspective are rendered. The image data corresponding to the points of the visible surfaces is referred to as "rendered content." The rendered content may be rendered by any known approach. In some embodiments, a CPU may control the overall operation of a system (e.g., AR system 100), while a GPU (e.g., the GPU 152) may render frames (i.e., translating a three-dimensional scene into a two-dimensional image) and may store the frames in frame buffer(s) (e.g., the frame buffer(s) 154). The objects have a defined shape and coordinate location, and can therefore be rendered by the system as content to be displayed to a user at its logical location and orientation.

At 306, the image data corresponding to points of visible surfaces of the objects and image data corresponding to points of non-visible surfaces of the objects from the first perspective are stored. The image data corresponding to the points of the visible surfaces is referred to as "rendered content," and the image data corresponding to the points of the non-visible surfaces is referred to as "non-rendered content." FIGS. 5-7 and 9 describe different approaches of selecting and storing the content (the rendered content and/or the non-rendered content). In some embodiments, the application can also determine the different granularity of content that will be stored. In some embodiments, the content is stored in a computer readable medium. The content can be stored in any type of data structure.

In one embodiment, the content is stored as a linked list. In this approach, the content is mapped out with a linked list and the different elements of the linked list correlate to different locations within the volumetric space. A linked list per pixel may be very sparse/compact as the linked list does not hold or include empty cells. A size of the linked list, however, may be unpredictable which may not be desired when consistent behavior is desired. A resolution of the linked list is non-linear with regards to depth as a pixel may have a constant angular size and thus grow in linear size as distance increases.

In another embodiment, the content is stored in an array structure, a true volumetric representation, and the like. The true volumetric representation may have a constant data footprint and may be constructed such that it has a constant linear size (which reduces resolution issues with large perspective changes), but the total data size may be large as many of cells of the true volumetric representation may be empty. In some embodiments, the content is stored in a voxel, surface definitions (e.g., shells, curves, and the like), N-dimensional data structures or graph representation thereof, and the like.

At 308, a request is received to display a frame from a second perspective. In some embodiments, this means that the user has moved from a first position to a second position. The application can use sensors and accelerators from a headset to identify the first and second positions of the user. In another embodiment, external cameras may also be used to identify the first and second positions of the user.

At 310, a new frame from the second perspective is generated using stored content, including rendered content and non-rendered content, from the previous frame. The rendered content and the non-rendered content from the previous frame are used during construction as sources for constructing the new frame from the second perspective without entirely regenerating the whole frame. By preserving the content from the previous frame, the application can determine which of the content is visible from the second perspective. Once the application determines which of the content is visible from the second perspective, the application takes the stored content and constructs what should be visible from the second perspective. As mentioned above, a disocclusion issue exists when image data is no longer available (e.g., discarded) to understand what is visible in the second perspective. In this approach, the disocclusion problem is solved because the application has preserved the non-rendered content in addition to the rendered content to make available for constructing the new frame.

In one embodiment, warping may be applied to the rendered content from the previous frame and any "holes" of the warped rendered content are "filled in" using the non-rendered content from the previous frame. Examples of content for which the application would apply construction include, for example, objects that were not visible in the previous frame and/or portions of visible objects that were not visible in the previous frame. Additional detail on the construction process is described in the description relating to FIG. 4G.

At 312, the frame that is constructed from the second perspective is then displayed to the user in real-time within the system.

Figure 4A:
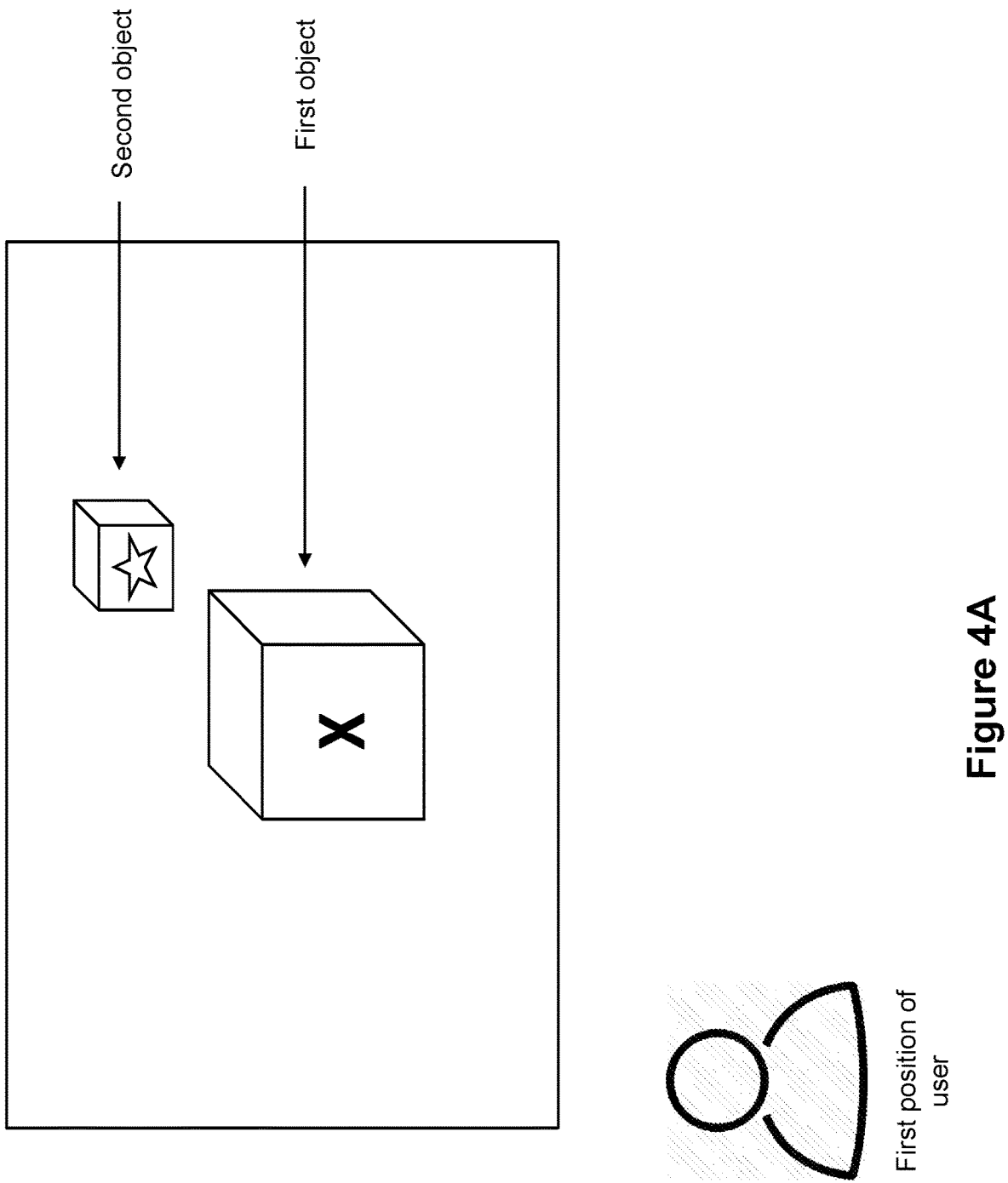
FIGS. 4A-4G show displaying a second perspective of an image using content from a first perspective, according to another embodiment.

FIGS. 4A-G illustrate an example of an approach for displaying a second perspective of a frame using image data for rendered content and non-rendered content from a first perspective, as according to some embodiments. FIG. 4A shows a user (e.g., the user 50) and a scene including a first object and a second object. The user is located in a first position. Each of the two objects are shaped as a regular block/cube, with the letter "X" on a front face of the first object and a star on a front face of the second object.

Figure 4B:
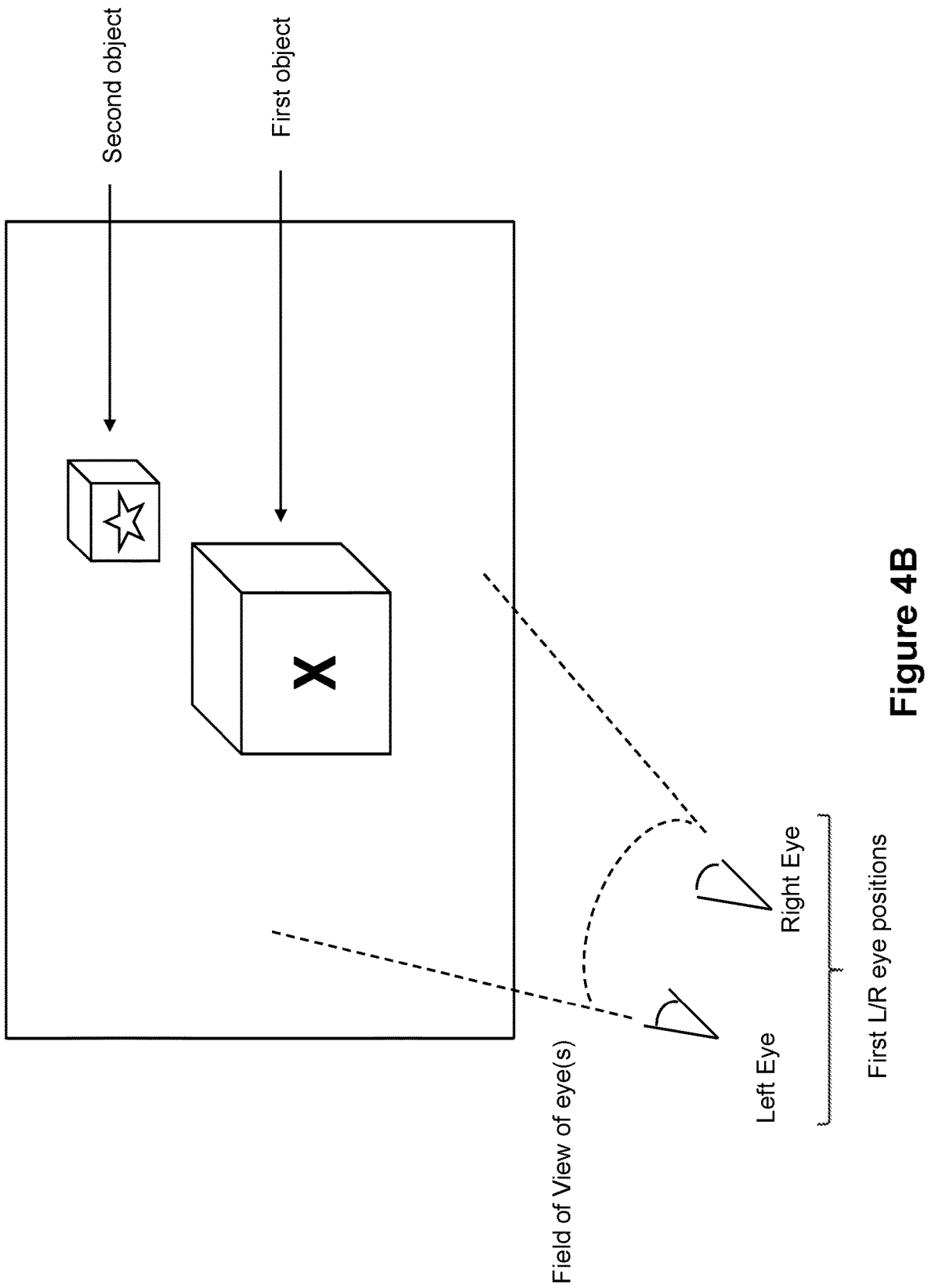
Figure 4C:
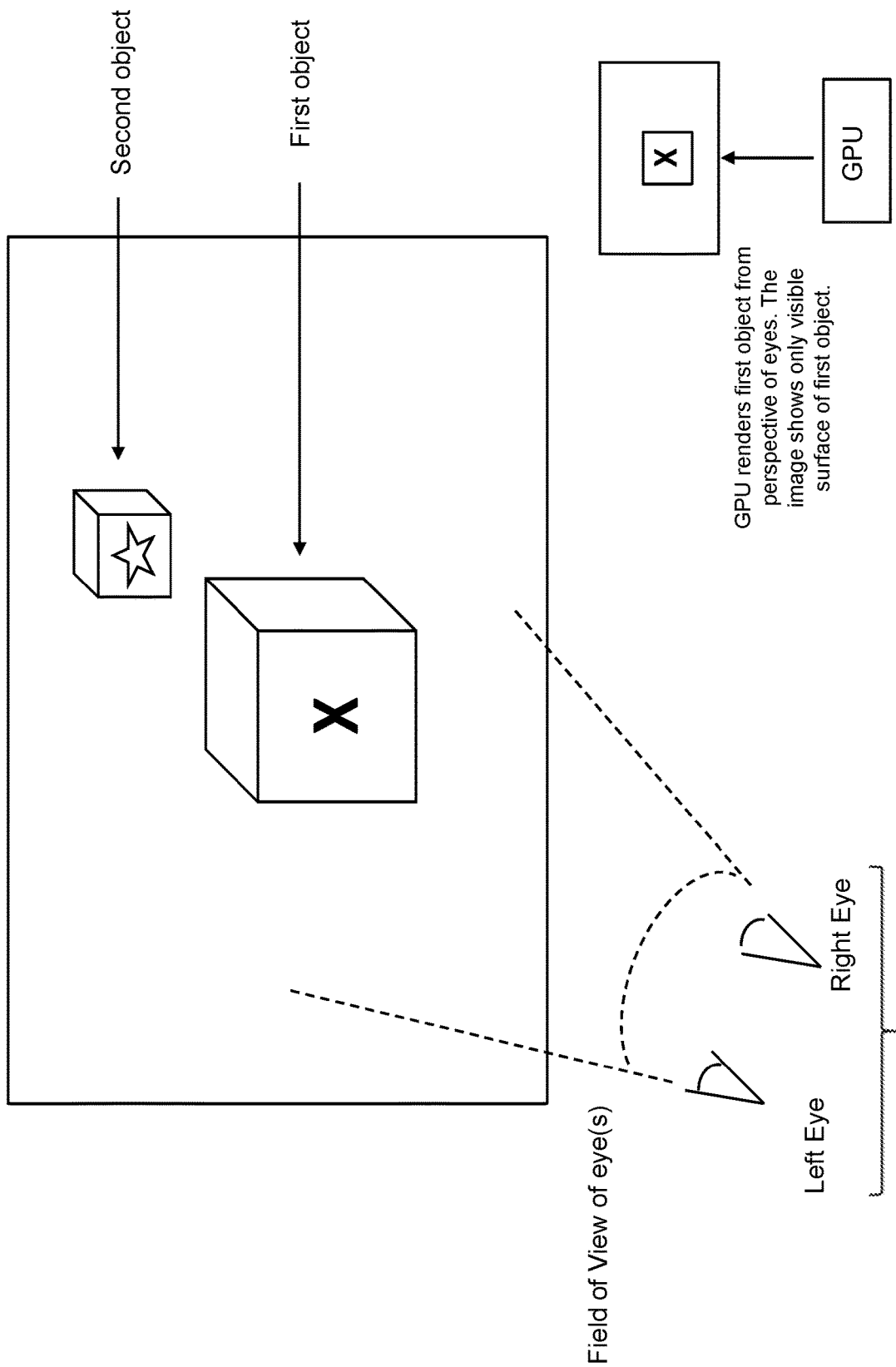
Figure 4D:
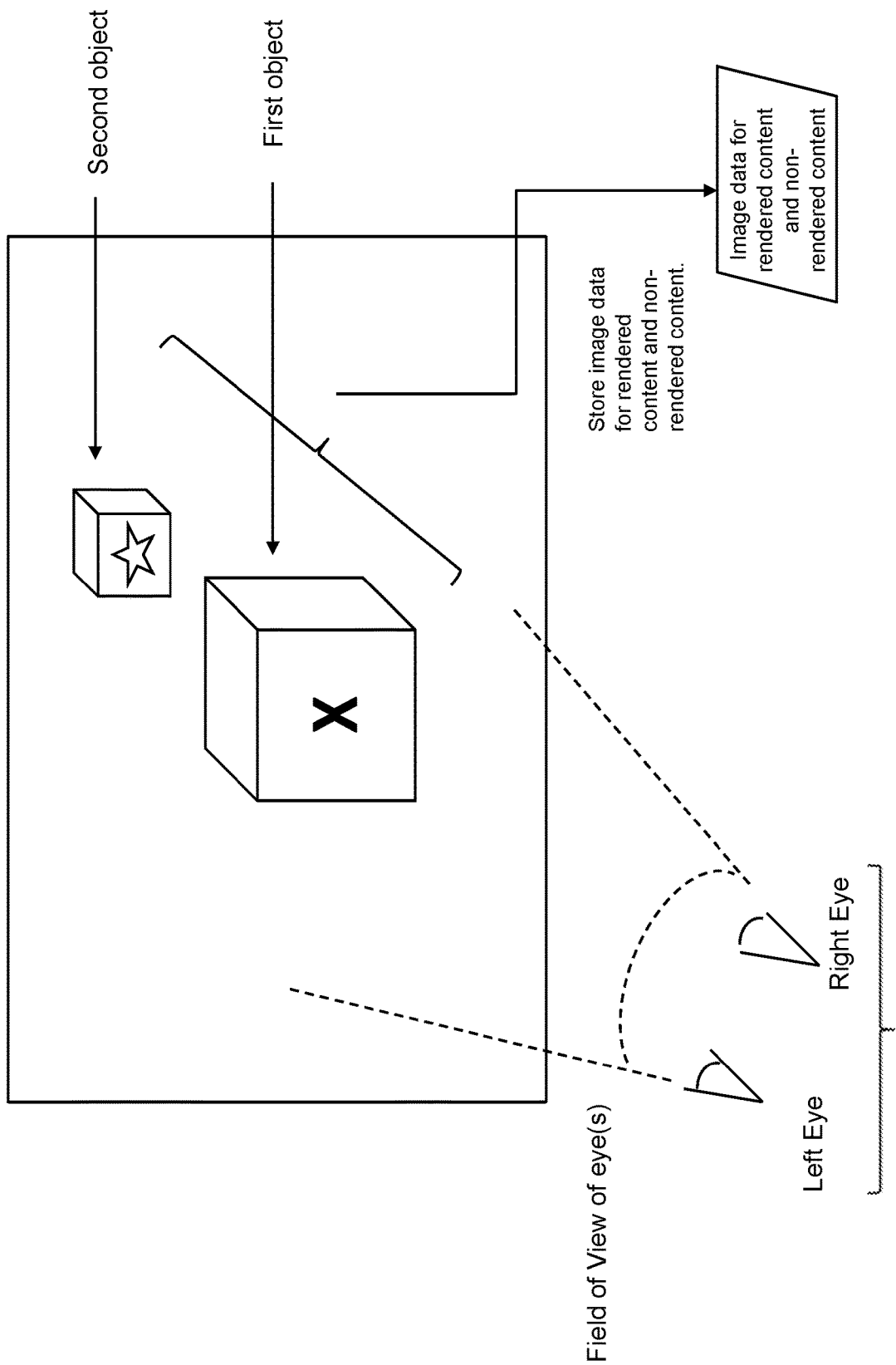

The eyes of the user may be located at a location and angular position as shown in FIG. 4B. The particular location and angular position of the eyes of the user will be referred to as a first perspective. In the first perspective, the eyes of the user are looking at the first and second objects from an angle such that the first object is completely blocking the second object. A GPU (e.g., the GPU 152) renders a frame including an image of the scene from the first perspective. In FIG. 4C, the GPU renders the frame from the first perspective showing only the front face of the first object with the letter "X"—without any part of the side faces of the first object or any parts of the second object being rendered—because, from the first perspective, only the front face of the first object is visible to the user.

The frame including the image of the scene from the first perspective is rendered. The frame includes image data. Image data corresponding to the points of the visible surfaces of the first and second objects from the first perspective are kept/stored. The image data corresponding to the points of the visible surfaces is referred to as "rendered content." Additionally, the image data corresponding to the points of non-visible surfaces of the first and second objects from the first perspective are also kept/stored. The image data corresponding to the points of the non-visible surfaces is referred to as "non-rendered content." In FIG. 4D, the application selects and stores the rendered content and the non-rendered content from the first perspective. The image data for the rendered content may contain information corresponding to volumetric data for objects, or portions thereof, that were displayed in the originally rendered frame, and the image data for non-rendered content may contain information corresponding to volumetric data for objects, or portions thereof, that were not displayed in the originally rendered frame.

Figure 4E:
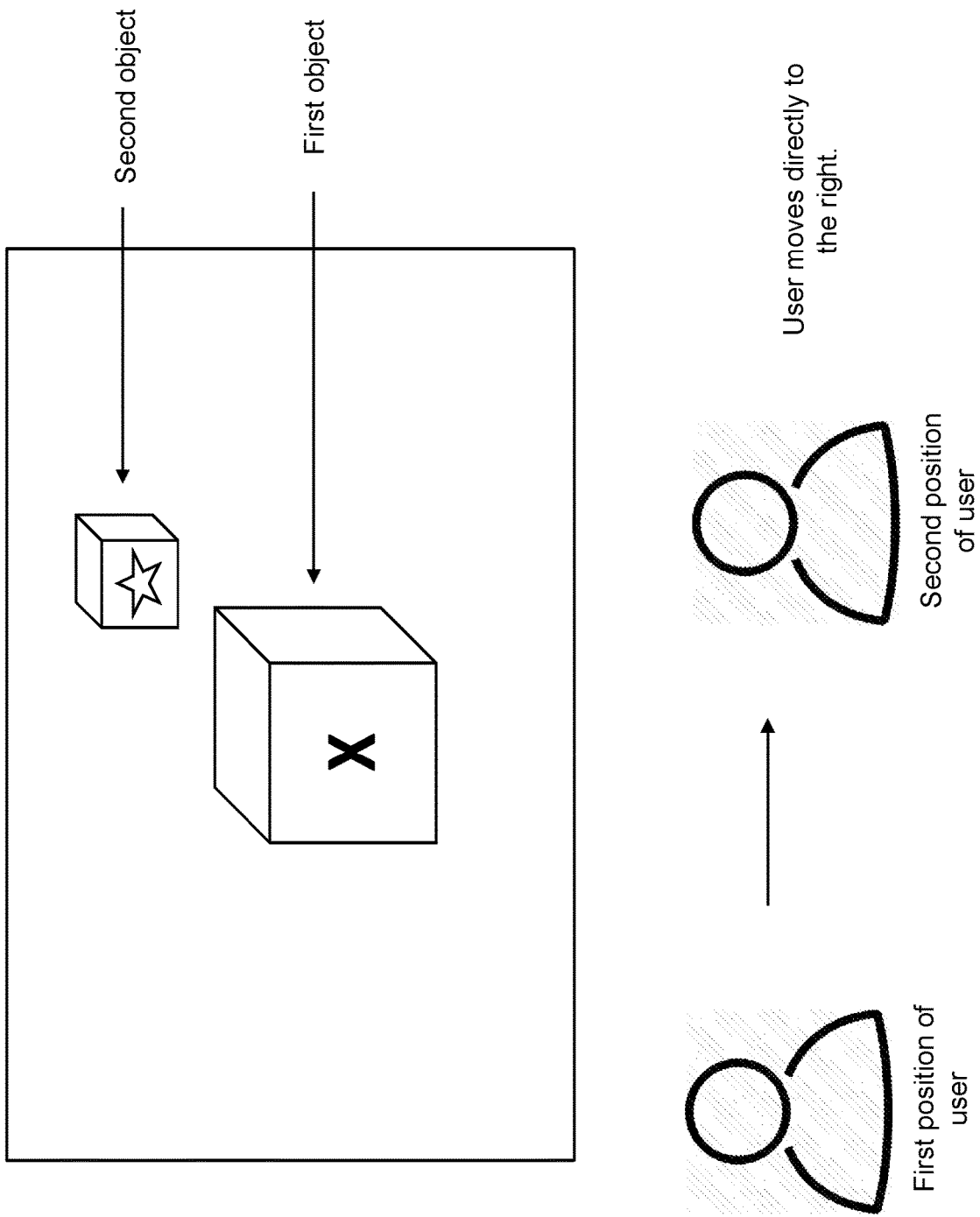
Figure 4F:
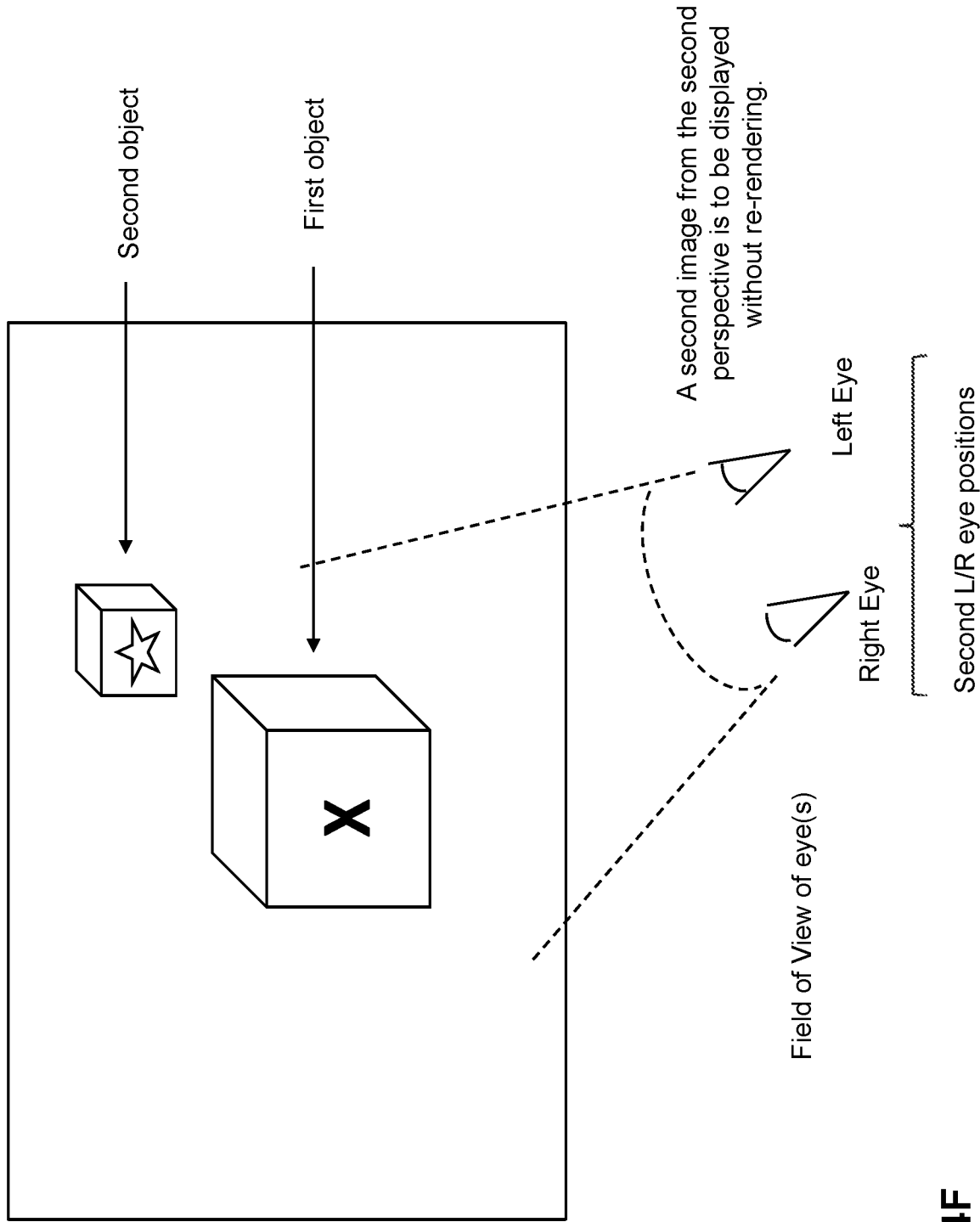

As shown in FIG. 4E, the user now moves to a second position directly to the right of the first position. At this point, the user will be looking at the first and second objects from a different position as compared to the first position. The eyes of the user may be located at a location and angular position shown in FIG. 4F. The particular location and angular position of the eyes of the user will be referred to as a second perspective. In the second perspective, the eyes of the user should see a frame that is different than the frame from the first perspective. In the second perspective, the eyes of the user should be seeing both the front and right faces of the first object and the front and right faces of the second object.

Figure 4G:
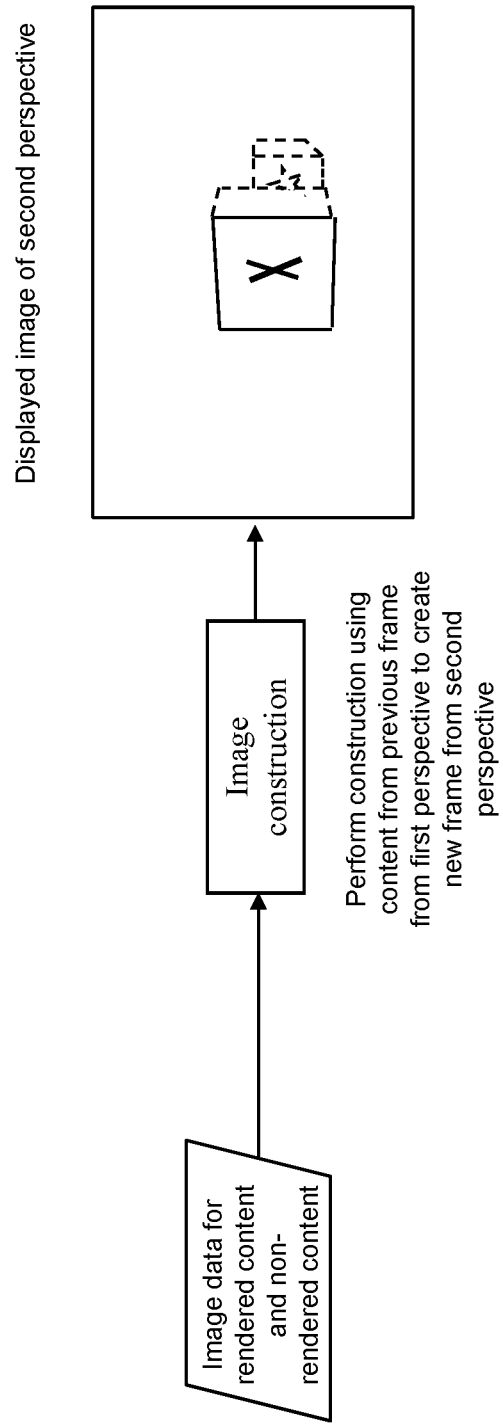

As shown in FIG. 4G, construction may be applied using the rendered content and the non-rendered content from the previous frame from the first perspective to create a new frame from the second perspective without entirely regenerating the whole scene. The application will first identify which of the rendered content (e.g., the front face of the first object) and the non-rendered content (e.g., the right face of the first object and the front and right faces of the second object) is visible from the second perspective. The application then takes the stored rendered content and the non-rendered content corresponding to the now visible content identified above and constructs what should be visible from the second perspective.

In one embodiment, warping is applied to the rendered content from the previous frame and any "holes" of the warped rendered content are "filled in" using the non-rendered content from the previous frame to construct the portions of the first and second objects that should be visible in the new frame from the second perspective that are not included in the rendered content from the previous frame.

FIGS. 4A-4G show an improvement over the alternative embodiment described in FIGS. 2A-2F because the new approach eliminates the disocclusion problem by storing non-rendered content from a previous frame from a first perspective as a source for constructing a new frame from a second perspective. This new approach also significantly reduces the amount of video artifacts that would have appeared during warping.

Figure 5:
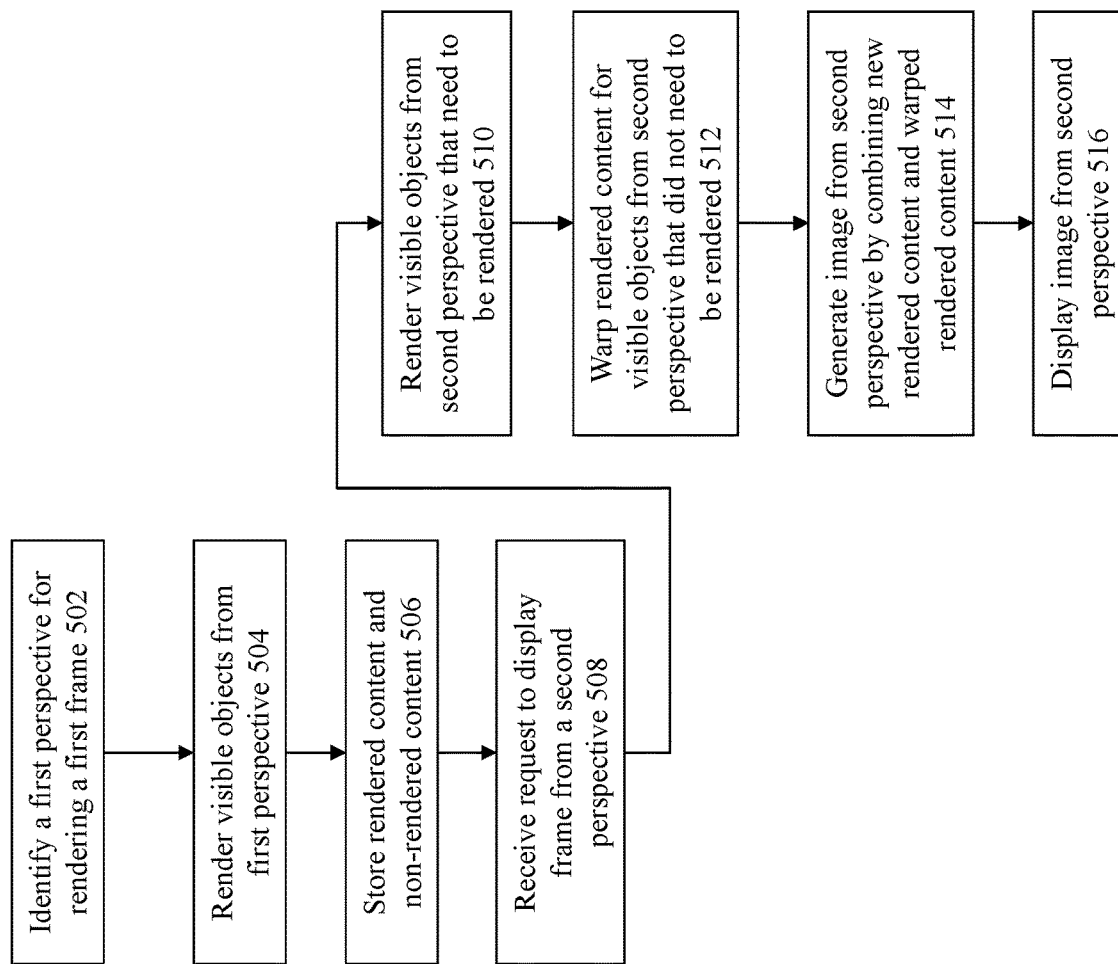
FIG. 5 shows a flowchart for an approach for displaying a second perspective of an image using newly rendered content from the second perspective and content from a first perspective, according to one embodiment.

Displaying a Second Perspective Using Image Data for Rendered Content and Non-Rendered Content by Warping and Generating FIG. 5 shows a flow chart for an approach to display a new frame from a new perspective using rendered content and non-rendered content from a previous perspective with warping and generating.

502 through 508 of FIG. 5 are the same as 302 through 308 of FIG. 3. At 510, objects that are now visible from the second perspective that were not visible—and therefore not rendered—from the first perspective are rendered. For example, the application can determine which objects are visible from the second perspective, compare the objects that are visible from the second perspective to the stored content (e.g., the rendered content and the non-rendered content) from the first perspective to identify objects that are now visible from the second perspective that were not visible—and therefore not rendered—from the first perspective, and render the identified objects to produce new rendered content.

At 512, rendered content for visible objects from the second perspective that did not need to be rendered is warped. For example, the application can determine which objects are visible from the second perspective, compare the objects that are visible from the second perspective to the stored content (e.g., the rendered content and the non-rendered content) from the first perspective to identify objects that are visible from the second perspective that were also visible—and therefore rendered—from the first perspective, and warp the identified objects to produce warped rendered content.

In some embodiments, the application can determine which objects are visible from the second perspective, compare the objects that are visible from the second perspective to the stored content (e.g., the rendered content and the non-rendered content) from the first perspective to identify (1) objects that are now visible from the second perspective that were not visible from the first perspective and (2) objects that are visible from the second perspective that were also visible from the first perspective. In this embodiment, the application then, at 510, renders the identified objects that are now visible from the second perspective that were not visible from the first perspective to produce new rendered content, and, at 512, warps the objects that are visible from the second perspective that were also visible from the first perspective to produce warped rendered content.

At 514, a new frame from the second perspective is generated by combining the new rendered content and the warped rendered content. The new rendered content and the warped rendered content are used during construction as sources for constructing the new frame from the second perspective without entirely regenerating the whole frame. Furthermore, 516 of FIG. 5 is the same as 312 of FIG. 3.

Figure 6A:
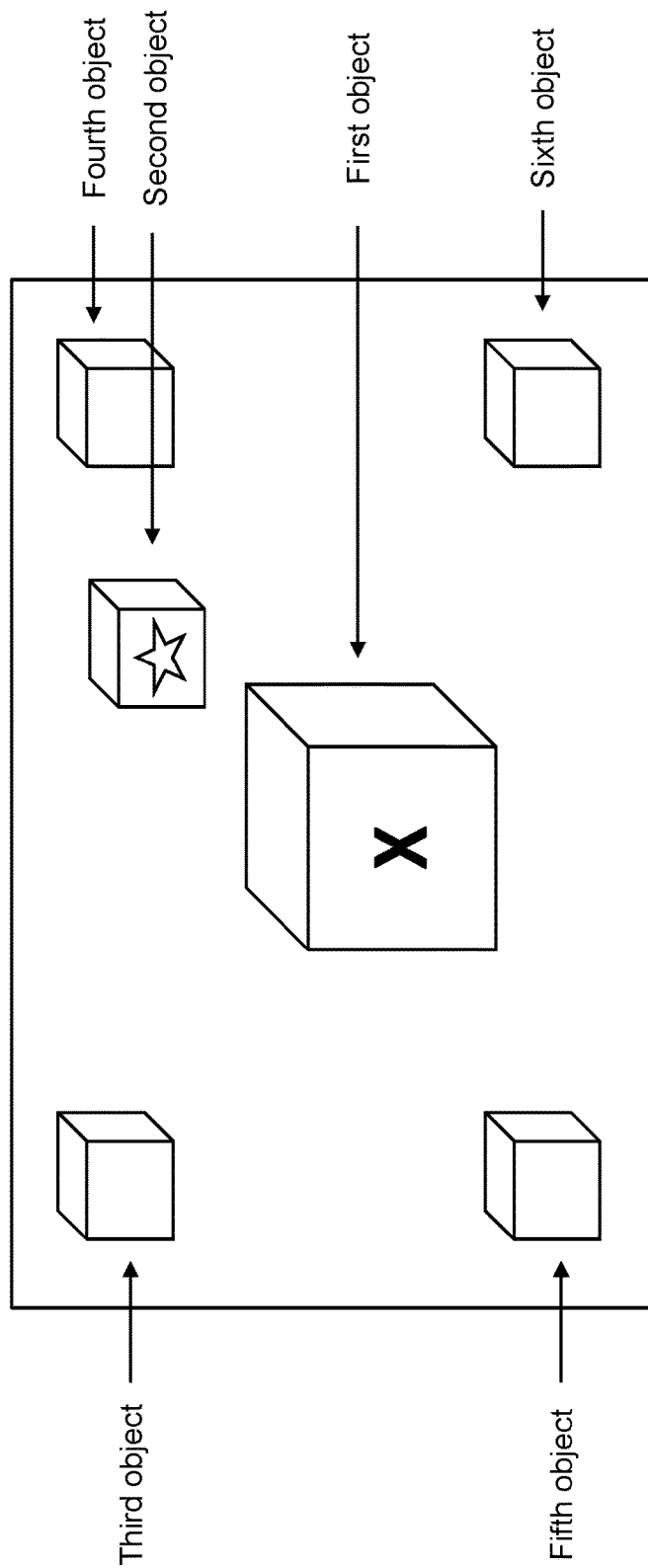
FIGS. 6A-6G show displaying a second perspective of an image using newly rendered content from the second perspective and content from a first perspective, according to one embodiment.

FIGS. 6A-G illustrate an example for an approach for displaying a second perspective of a frame using newly rendered content from the second perspective and content from the first perspective, according to one embodiment. FIG. 6A shows a user (e.g., the user 50) and a scene including a first through sixth objects. The user is located at a first position. Each of the six objects are shaped as regular block/cube, with the letter "X" on a front face of the first object and a star on a front face of the second object.

Figure 6B:
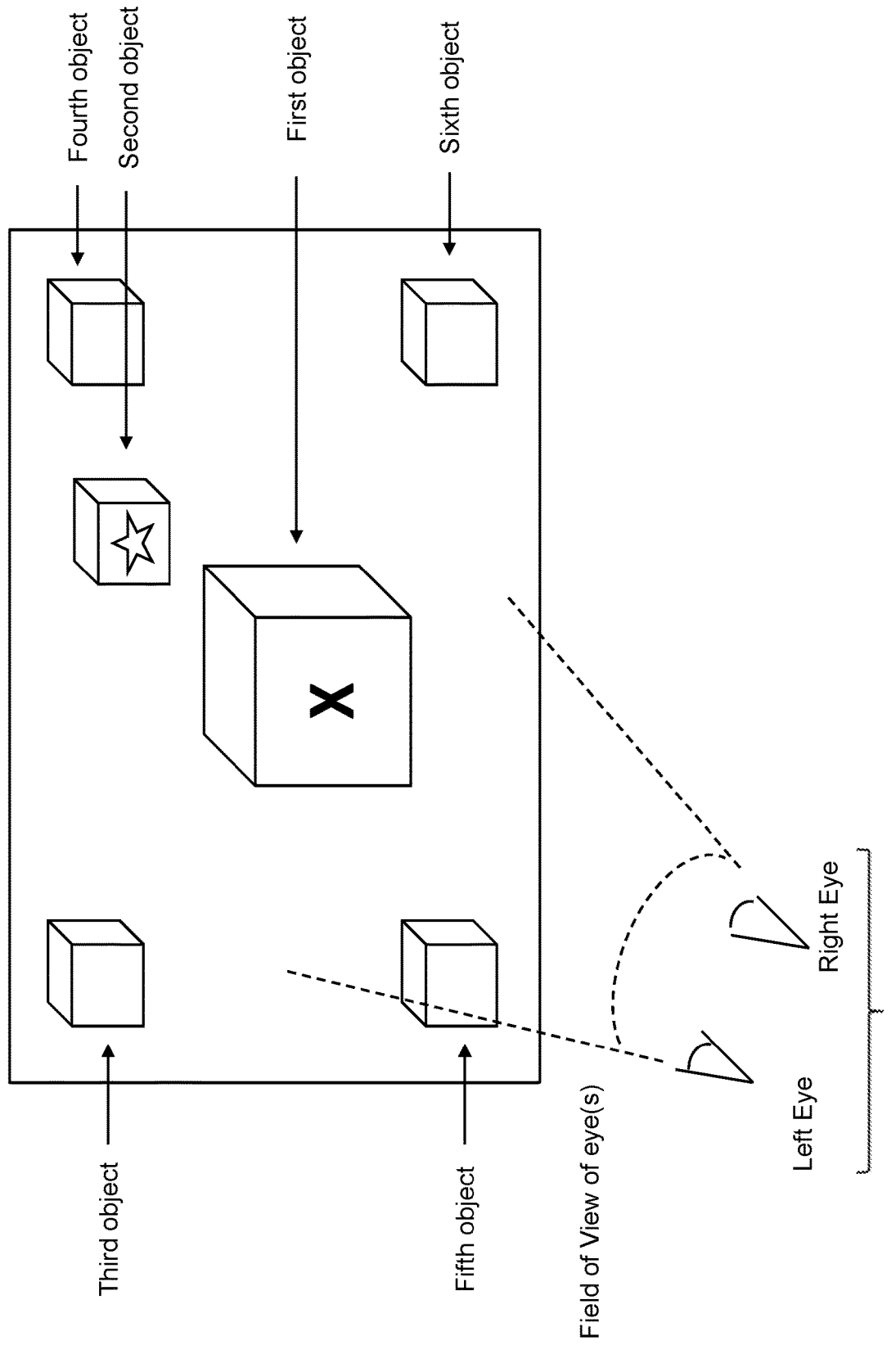
Figure 6C:
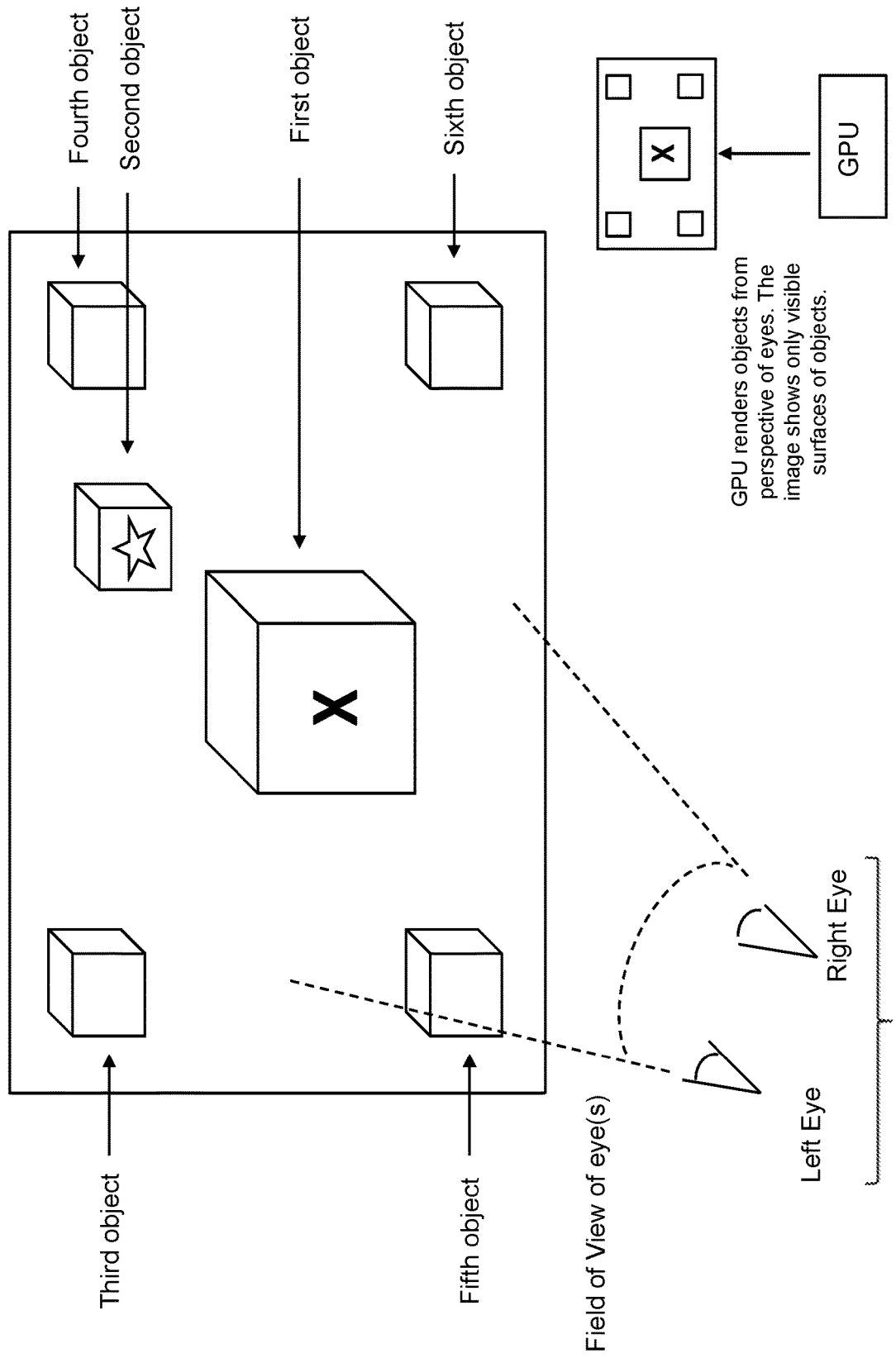
Figure 6D:
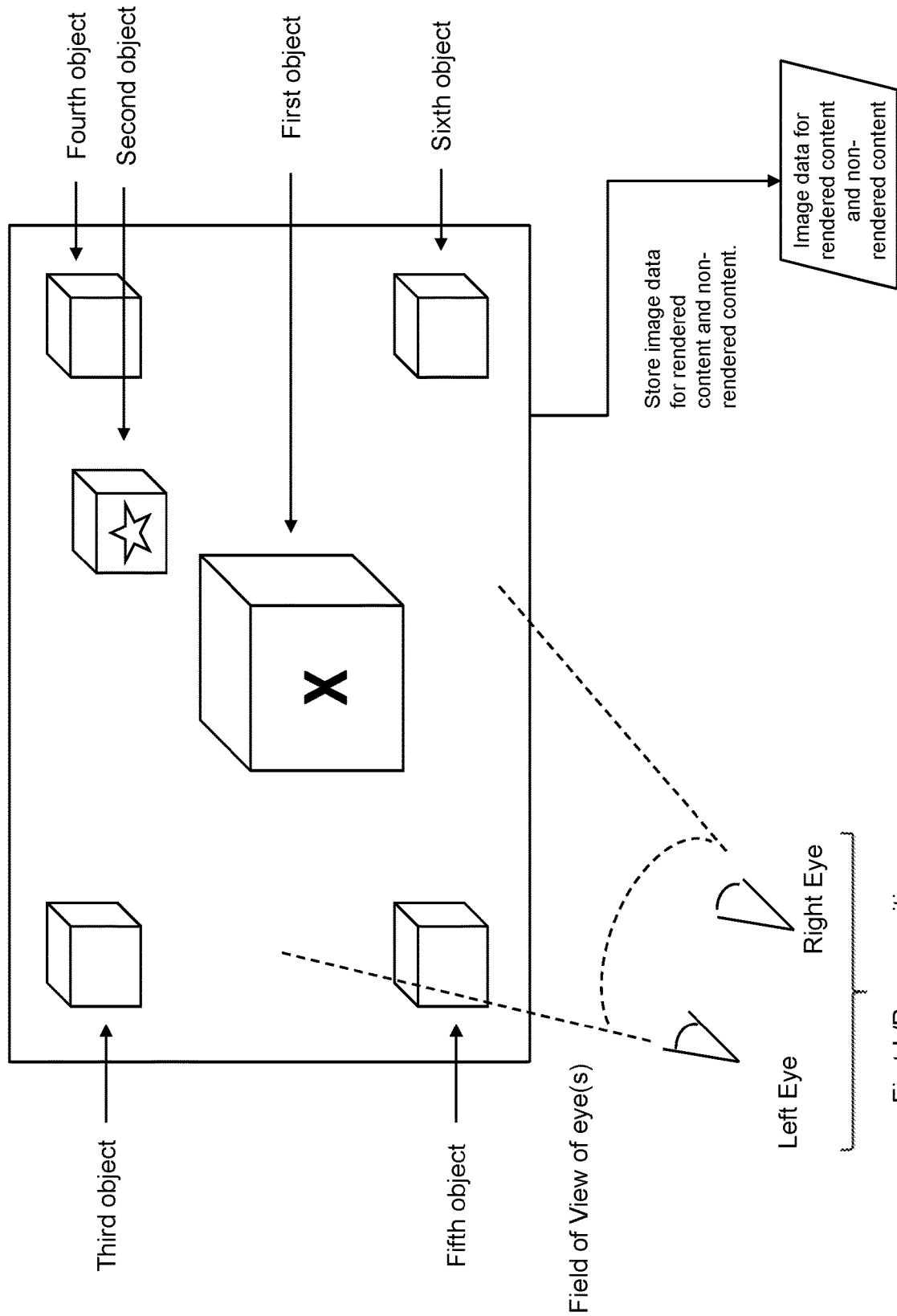

Eyes of the user may be located at a location and angular position as shown in FIG. 6B. The particular location and angular position of the eyes of the user will be referred to as a first perspective. In the first perspective, the eyes of the user are looking at the first through sixth objects from an angle such that the first object is completely blocking the second object and the third through sixth objects are visible. A GPU (e.g., the GPU 152) renders a frame including an image of the scene from the first perspective. In FIG. 6C, the GPU renders the frame from the first perspective showing only the front faces of the first object and third through sixth objects, without any part of the side faces of the first object and third through sixth objects or any parts of the second object being rendered—because, from the first perspective, only the front faces of the first object and third through sixth objects are visible to the user.

The frame including the image of the scene from the first perspective is rendered. The frame includes image data. Image data corresponding to the points of the visible surfaces of the first through sixth objects from the first perspective are kept/stored. The image data corresponding to the points of the visible surfaces is referred to as "rendered content." Additionally, the image data corresponding to the points of non-visible surfaces of the first through sixth objects from the first perspective are also kept/stored. The image data corresponding to the points of the non-visible surfaces is referred to as "non-rendered content." In FIG. 6D, the application selects and stores the rendered content and the non-rendered content from the first perspective. The image data for the rendered content may contain information corresponding to volumetric data for objects, or portions thereof, that were displayed in the originally rendered frame, and the image data for non-rendered content may contain information corresponding to volumetric data for objects, or portions thereof, that were not displayed in the originally rendered frame.

Figure 6E:
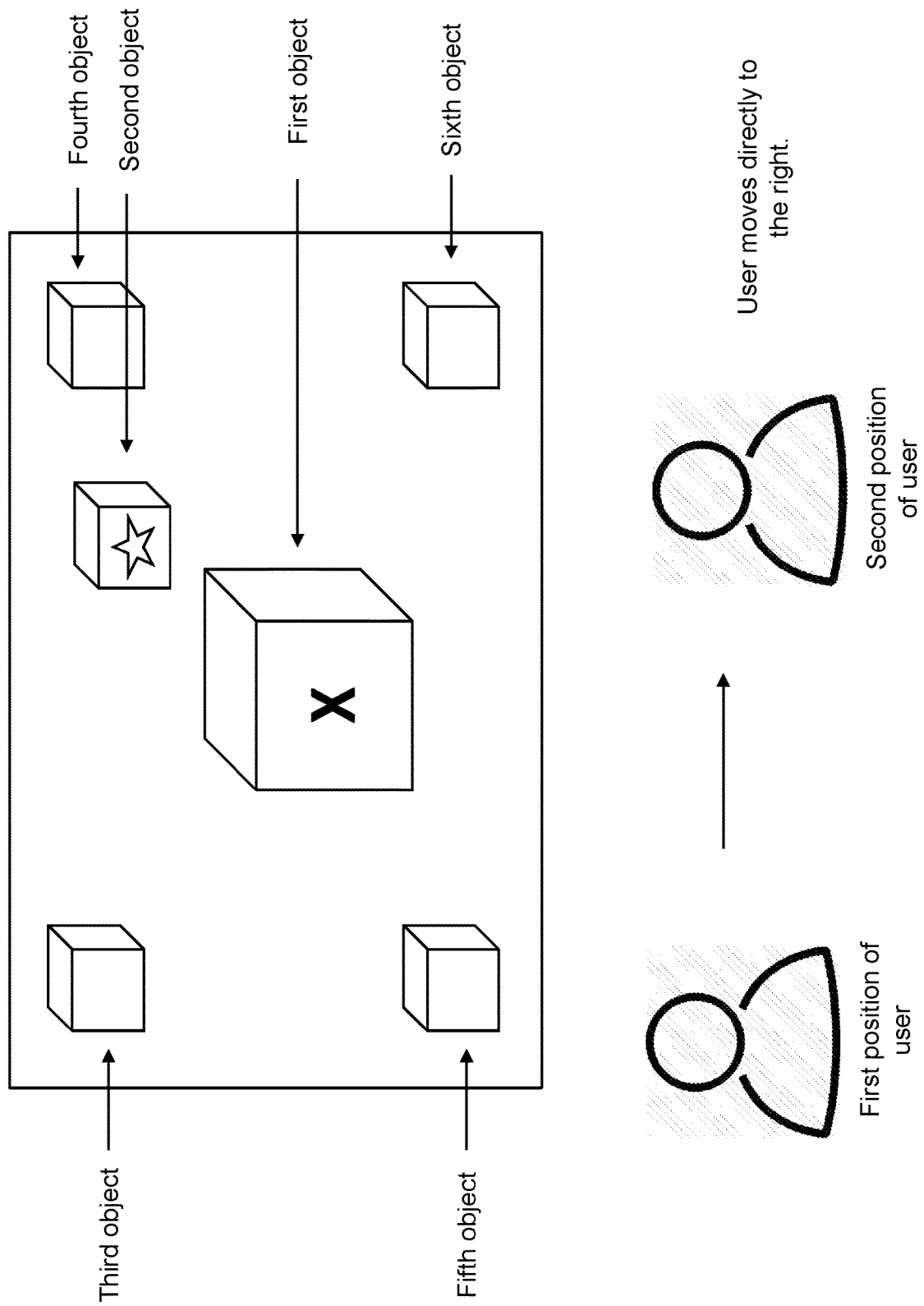
Figure 6F:
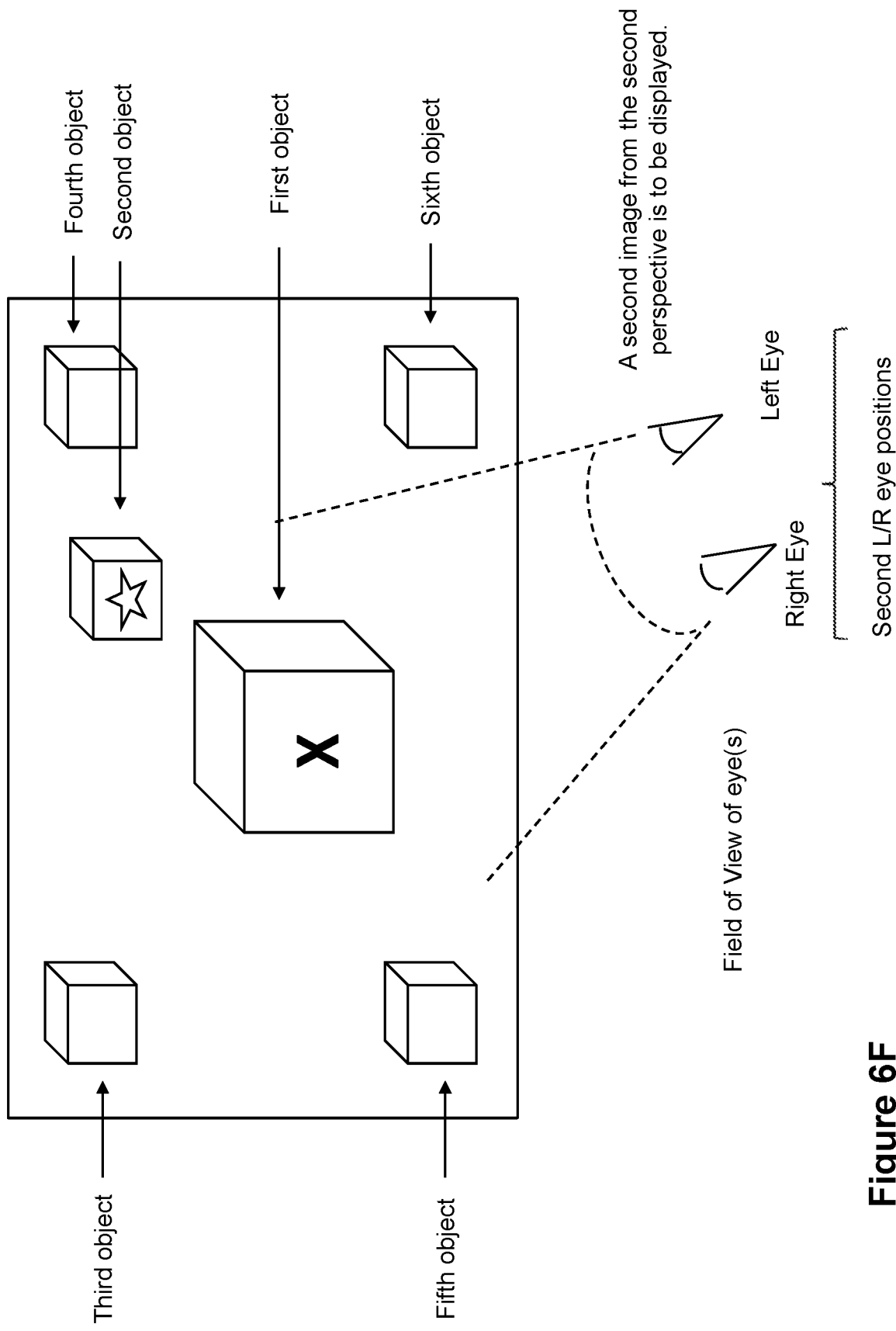

As shown in FIG. 6E, the user now moves to a second position directly to the right of the first position. At this point, the user will be looking at the first through sixth objects from a different position as compared to the first position. The eyes of the user may be located at a location and angular position shown in FIG. 6F. The particular location and angular position of the eyes of the user will be referred to as a second perspective. In the second perspective, the eyes of the user should see a frame that is different than the frame from the first perspective. In the second perspective, the eyes of the user should be seeing both the front and right faces of the each of the first through sixth objects.

Figure 6G:
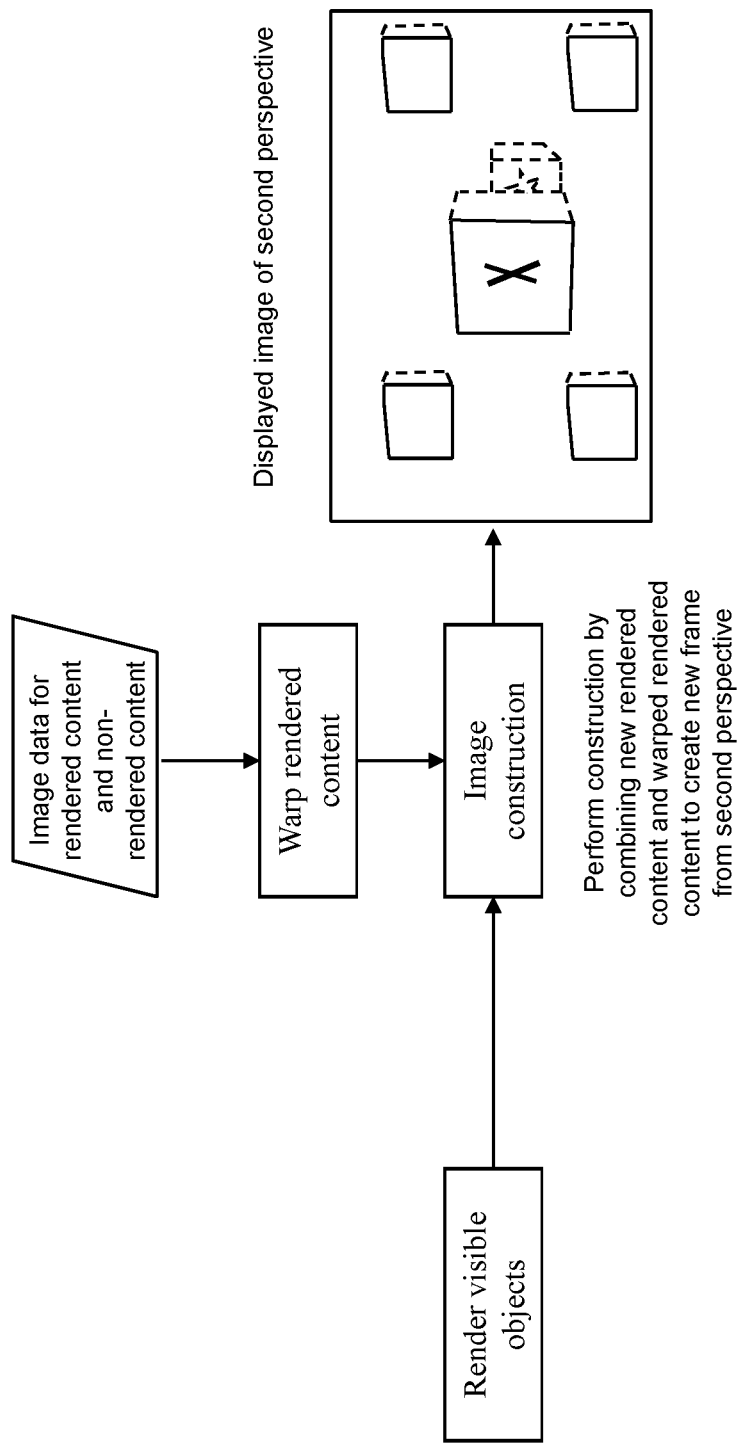

As shown in FIG. 6G, construction may be applied using newly rendered content and rendered content and the non-rendered content from the previous frame from the first perspective to create a new frame from the second perspective without entirely regenerating the whole scene. For example, the application will determine which objects are visible from the second perspective (e.g., first through sixth objects), compare the objects that are visible from the second perspective to the stored content (e.g., the rendered content and the non-rendered content) from the first perspective to identify (1) objects that are now visible from the second perspective that were not visible from the first perspective (e.g., the second object and right-side faces of the other objects) and (2) objects that are visible from the second perspective that were also visible from the first perspective (e.g., the front faces of the first object and the third through sixth objects). The application then renders the identified objects that are now visible from the second perspective that were not visible from the first perspective (e.g., the second object and the right-side faces of the other objects) to produce new rendered content, and warps the objects that are visible from the second perspective that were also visible from the first perspective (e.g., the front face of the first object and the third through sixth objects) to produce the warped rendered content.

Image construction is performed to construct a new frame from the second perspective. The image construction includes combining the new rendered content and the warped rendered content. The new rendered content and the warped rendered content are used during the image construction as sources for constructing the new frame from the second perspective without entirely regenerating the whole frame.

Various Embodiments of Selecting Non-Rendered Content for Storage

There are different sets, quantities, granularities, types and/or specific image elements that one may want to store for non-rendered content. The flowcharts in FIGS. 7-8 and 10 describe details of alternative approaches to select which of the available non-rendered content is to be stored. Each of the approaches may be more advantageous to use in particular circumstances. To reiterate, image data corresponding to points of non-visible surfaces of objects from a first perspective is referred to as "non-rendered content."

Figure 7:
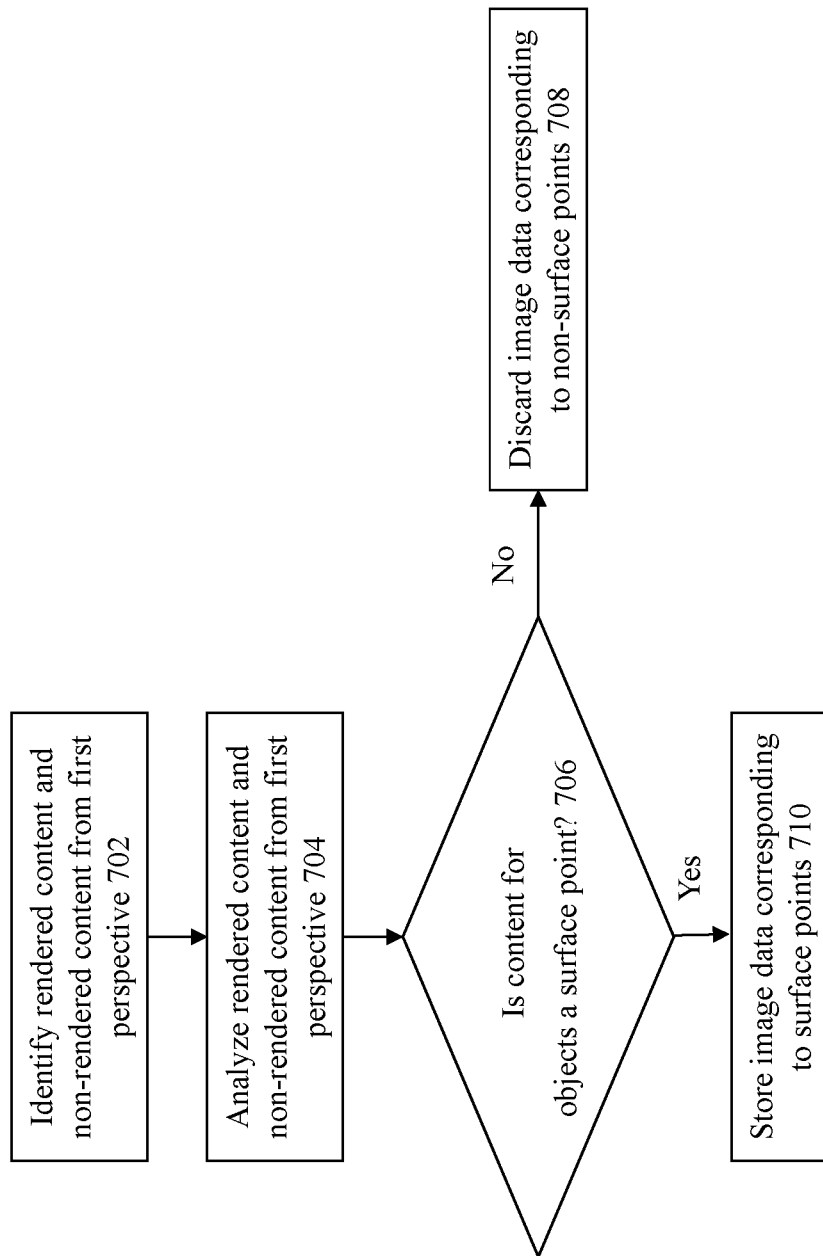
FIG. 7 shows a flowchart for an approach for selecting and storing image data corresponding to surface points, according to one embodiment.

FIG. 7 shows a flowchart for an approach for storing content by only storing surface points for the content, according to one embodiment. This approach operates upon the idea that internal points of objects are not visible. Therefore, in the interest of lowering storage costs, the image data of the content corresponding to the surface points of the objects is kept/stored, and the image data of the content corresponding to the non-surface points of the objects is discarded.

At 702, image data corresponding to points of visible surfaces and non-visible surfaces of objects from a first perspective is identified. The image data corresponding to the visible surfaces is referred to as "rendered content," and the image data corresponding to the non-visible surfaces is referred to as "non-rendered content."

At 704, the rendered content and the non-rendered content from the first perspective are analyzed. At 706, characteristics of the rendered content and the non-rendered content, such as whether points of objects from the first perspective are surface points or internal points, whether objects are semi-transparent or opaque, and the like, are determined. If a point of the object is identified as a surface point, then the image data of the content (e.g., the rendered content and/or the non-rendered content) corresponding to the surface point is stored 710 for construction of a frame from a different perspective. If a point of the object is not identified as a surface point, then the image data of the content (e.g., the rendered content and/or the non-rendered content) corresponding to the non-surface point is discarded at 708 because that content will not be used in construction of the frame from the different perspective. In some embodiments, if the characteristics of the object indicate the object is a semi-transparent object, some or all of the non-surface points of the semi-transparent object may be stored for construction of the frame from the different perspective, instead of discarded. For example, a blend mode as well as color data of some or all of the non-surface points of the semi-transparent object may be stored.

As noted above, the content may be stored in any suitable data structure, such as, for example, a linked list, a voxel, surface definitions (e.g., shells, curves, and the like), N-dimensional data structures or graph representation thereof, and the like.

The advantage of the approach depicted in FIG. 7 is that this approach requires less storage resources because only content that corresponds to surface points is stored. However, a drawback to this approach is that the application may require more processing power and time to determine whether content for objects are surface points or not.

Figure 8:
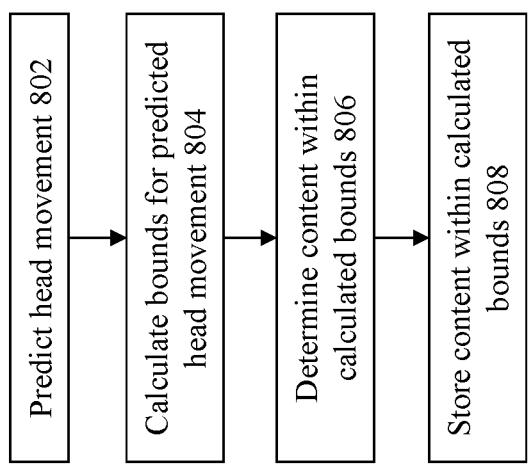
FIG. 8 show a flowchart for an approach for selecting and storing image data corresponding to nominal range of motion, according to one embodiment.

FIG. 8 shows a flowchart for an approach for only storing content corresponding to a predicted head movement, according to one embodiment. This approach operates upon the idea that the application may not need to store all of the content, but that the application can select and store content within calculated bounds of the predicted head movement. If the content is positioned outside of the calculated bounds of the predicted head movement, then that content may be discarded because the user would not likely be in that location.

At 802, the application predicts a user's head movement. The application may predict the user's head movement by using one or more sensors mounted to a frame structure (e.g., the frame structure 102) for detecting the position and movement of the head of the user and/or the eye position and inter-ocular distance of the user. For example, if the user is currently moving in the same direction or has done so at some momentary period of time in the near past at a particular speed—the application may predict that the user will be moving in the same direction in the near future.

In some embodiments, these sensor(s) may include image capture devices (such as camera), microphones, inertial measurement units (IMUs), accelerometers, compasses, GPS units, radio devices, and/or gyros. These devices may be used to sense, measure, or collect information about the user's head movements. For instance, these devices may be used to detect and/or measure movements, speeds, acceleration, and/or positions of the head of the user. In some embodiments, a user orientation detection module detects the instantaneous position of the user's head and may predict the position of the user's head by position data received from the sensor(s). The user detection orientation module can also track the user's eyes, and the direction and/or distance at which the user is focused based on the tracking data received from the sensor(s).

At 804, bounds for the predicted head movement are calculated. The bounds are calculated by considering a predicted direction, a current speed and/or predicted speed of movement for the user. From these values, bounds can be calculated. In one embodiment, the calculated bounds for the predicted head movement represents an error of the predicted head movement.

In one embodiment, calculated bounds for the predicted head movement corresponds to a maximum predicted motion that the user will move for a second location. It may not be efficient for the application to store content (e.g., rendered content and/or non-rendered content) that is not within the predicted range of motion because that content would likely not be used. At 806, the application determines content that is within the calculated bounds for the predicted head movement.

At 808, the content within the calculated bounds for the predicted head movement is stored. As noted above, the content may be stored in any suitable data structure, such as, for example, a linked list, a voxel, surface definitions (e.g., shells, curves, and the like), N-dimensional data structures or graph representation thereof, and the like.

A drawback to this approach is that the application may require more processing power to calculate the bounds for the predicted head movement and determine whether the content is within the calculated bounds for the predicted head movement.

Constructing Scenes Containing Semi-Transparent Objects

As mentioned previously, warping may be applied to rendered content from a previous frame and any "holes" of the warped rendered content may be "filled in" using rendered content and/or non-rendered content from the previous frame. FIGS. 9A-9F describe a problem with and warping rendered content from the previous frame and filling in the holes using the non-rendered content where the previous frame includes semi-transparent objects. Semi-transparent objects add an additional layer of complexity to the previous embodiments described because the user can "see through" semi-transparent objects to view opaque objects behind the semi-transparent objects. Furthermore, when the opaque object is viewed through the semi-transparent object from a first perspective, the opaque object behind the semi-transparent object may appear distorted or blurred. If the opaque object behind the semi-transparent object is rendered in a blurred or blended way, then from a second perspective, it is difficult to apply classical warping to achieve a realistic view of the opaque object in a warped frame.

Figure 9A:
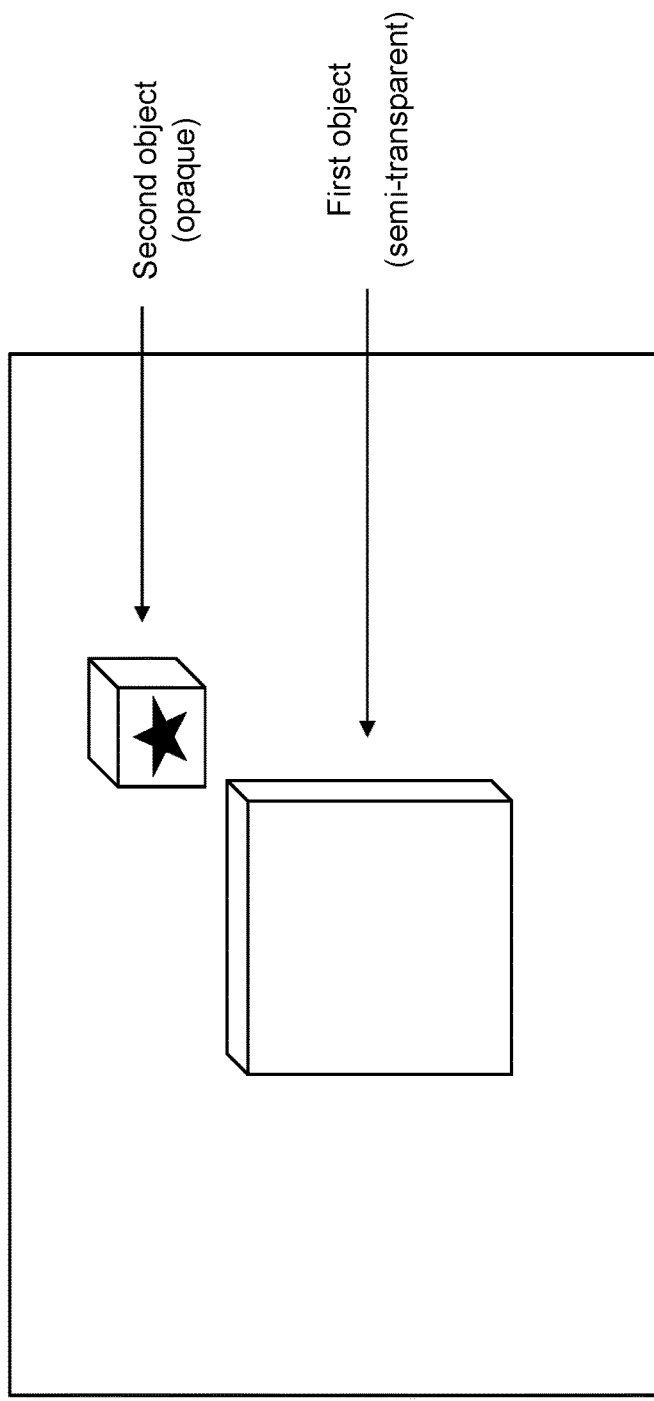
FIGS. 9A-9F show displaying a second perspective of an image using image data corresponding to opaque and semi-transparent objects, according to one embodiment.
Figure 9A:
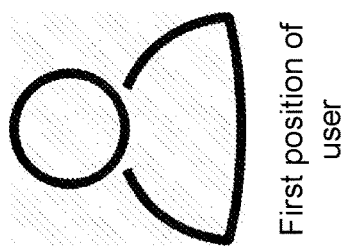

FIGS. 9A-9F illustrate a problem that results from warping semi-transparent and opaque objects. FIG. 9A shows a user (e.g., the user 50) and a scene including a first object and a second object. The user is located in a first position. The first object is a thin cube made up of a semi-transparent material such that the thin cube is "see through," but will make any objects behind the semi-transparent material appear distorted or blurred. The second object is an opaque object with a star on a front face.

Figure 9B:
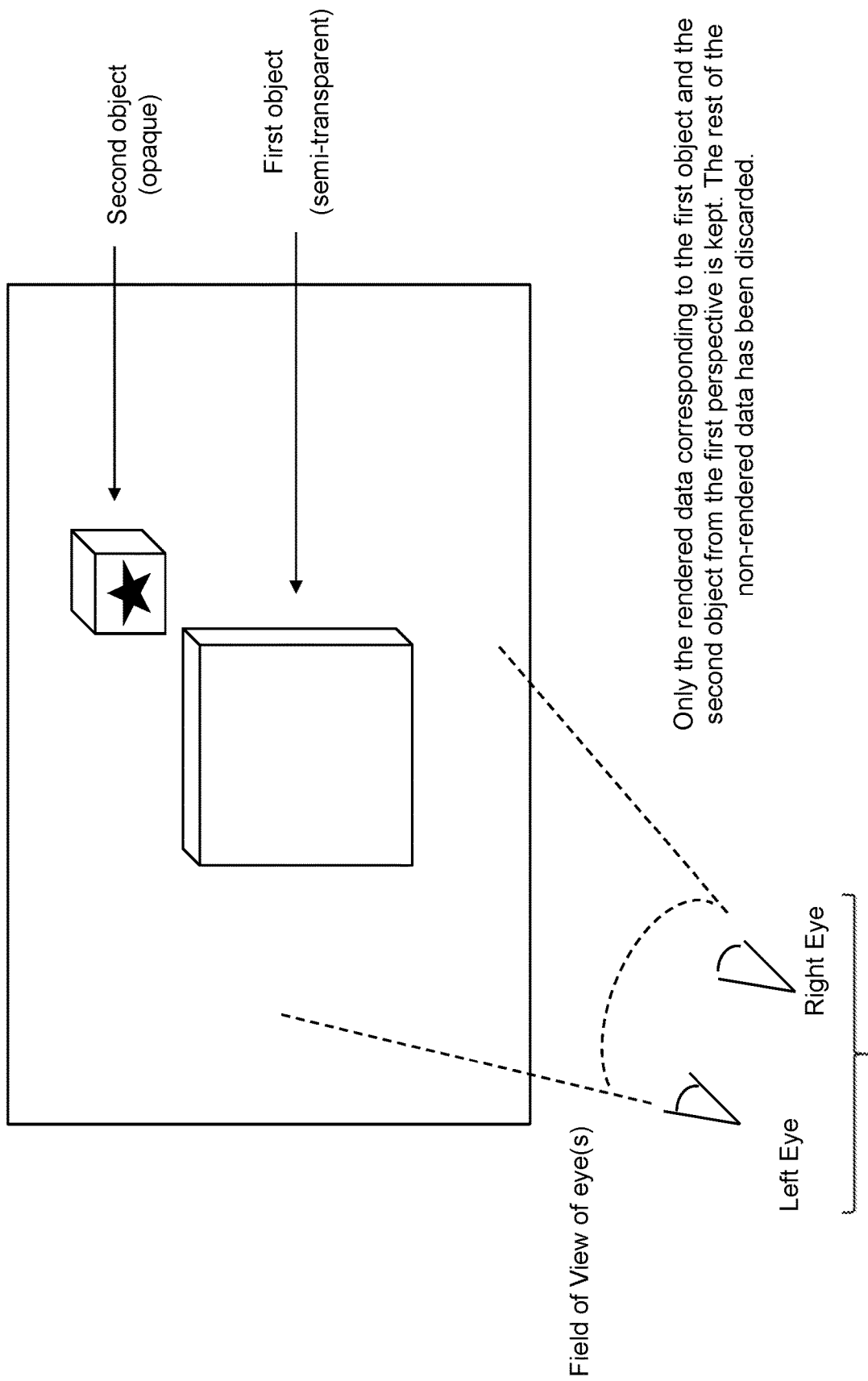

Eyes of the user may be located at a location and angular position as shown in FIG. 9B. The particular location and angular position of the eyes of the user will be referred to as a first perspective. In the first perspective, the eyes of the user are looking directly at the first and second objects from an angle such that the second object is located directly behind the first object. From the first perspective, the front face of the second object can be seen through the first object, but the star on the front face of the second object appears blurred or distorted due to the semi-transparent materials of the first object which is in front of the second object.

Figure 9C:
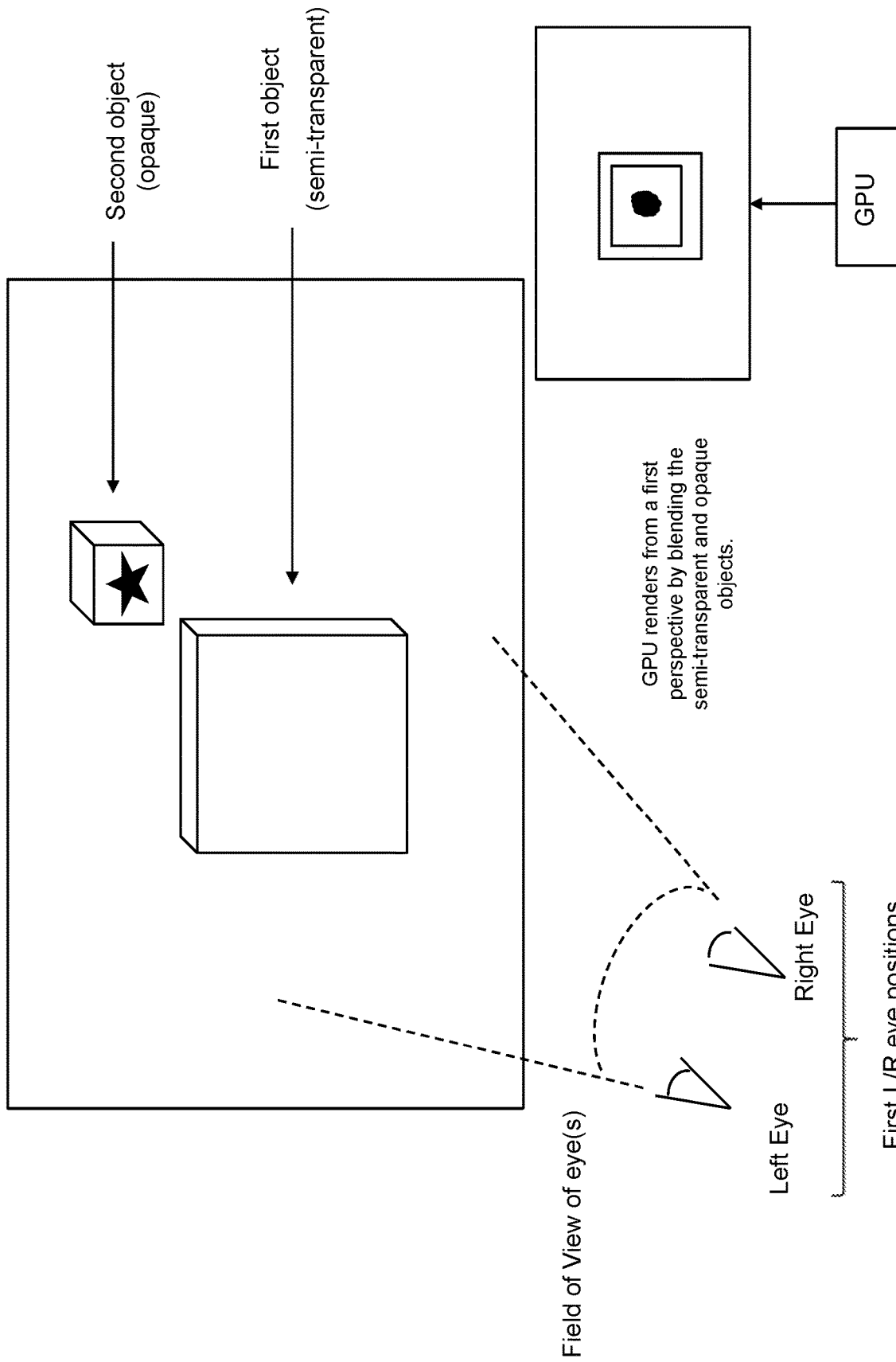

As shown in FIG. 9C, points of surfaces labeled with the star on the second object may be seen through the first object. The image data corresponding to points of visible surfaces (e.g., clearly visible and non-clearly visible (e.g., blurred or distorted)) of the first and second objects (e.g., the front face of the first object and a blurred or distorted version of the front face of the second object) from the first perspective is kept/stored. The image data corresponding to the points of the visible surfaces is referred to as "rendered content." The image data corresponding to points of non-visible surfaces of the first and second objects (e.g., all faces of the first object except for the front face and all non-blurred faces of the second object) from the first perspective is discarded. The image data corresponding to the non-visible surfaces of the first and second objects is referred to as "non-rendered content." Other than the rendered content, the application has lost other content (e.g., the non-rendered content) from the first perspective. The non-rendered content is discarded during depth testing because the application only keeps the rendered content. If the user tries to view the frame from another angle or perspective, the non-rendered content is useless because the application has discarded of it.

As shown in FIG. 9C, a GPU (e.g., the GPU 152) renders a frame including an image of the scene from the first perspective. The rendering may include blending the first and second objects. The frame from the first perspective shows the front face of the second object as being viewed through the front face of the first object such that the front face of the second object appears blurred or distorted.

Figure 9D:
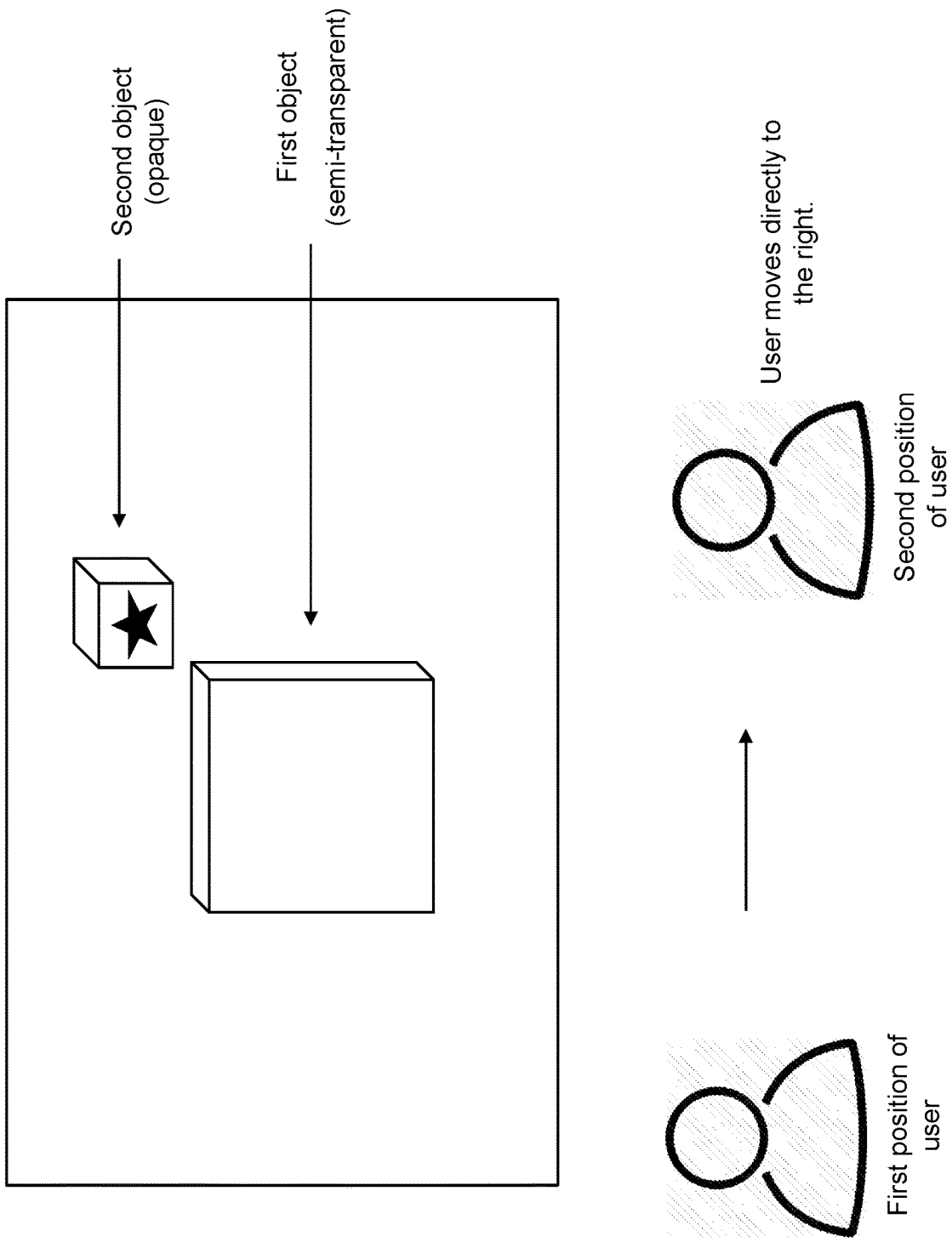

As shown in FIG. 9D, the user now moves to a second position directly to the right of the first position. At this point, the user will be looking at the first and second objects from a different position as compared to the first position.

Figure 9E:
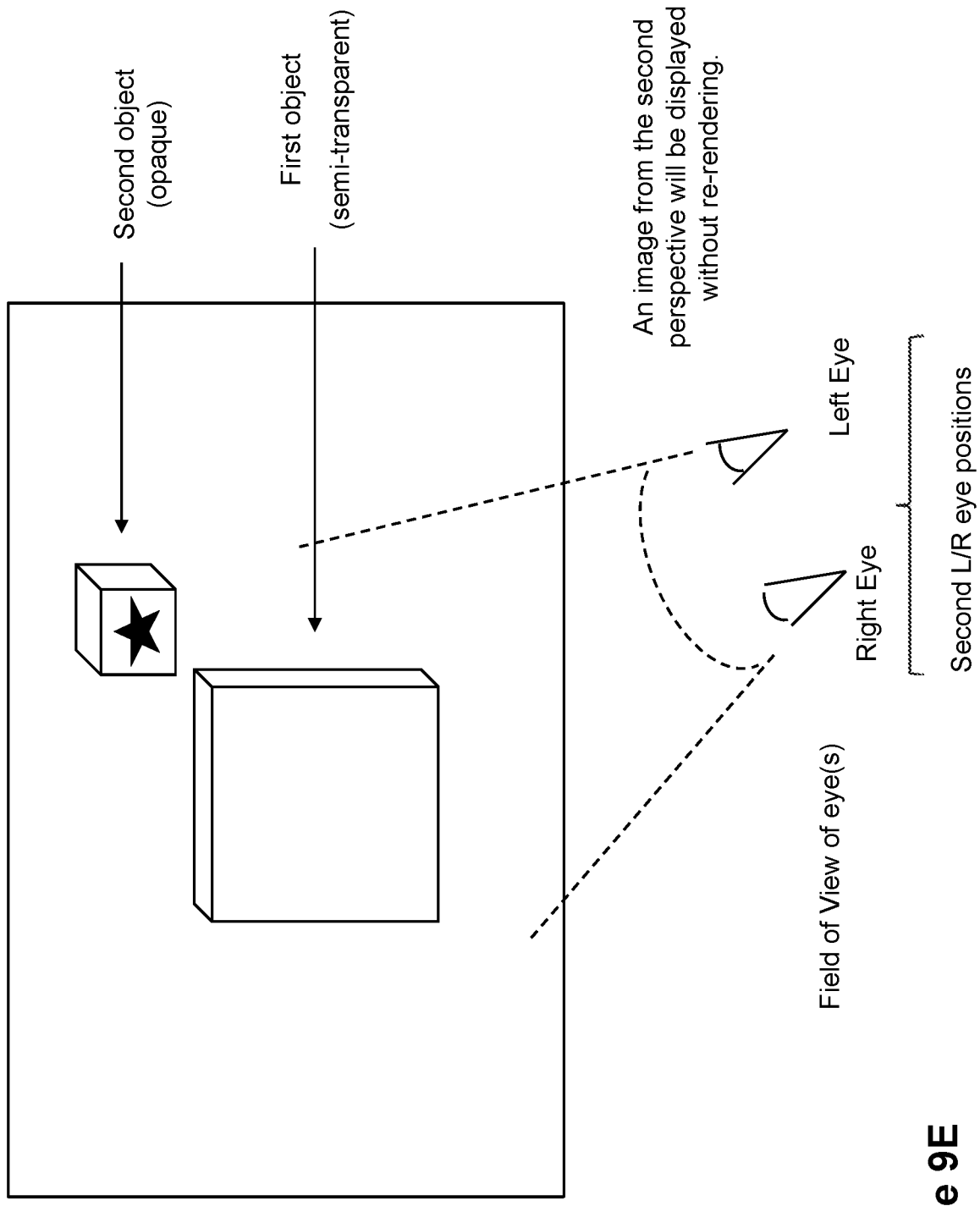

The eyes of the user may be located at a location and angular position shown in FIG. 9E. The particular location and angular position of the eyes of the user will be referred to as a second perspective. In the second perspective, the eyes of the user should be seeing (1) the first object without the distorted version of the second object behind the first object (e.g., the image shown in the previous frame) and (2) the second object without any blurring or distortion. Specifically, the user should be seeing both the front and right faces of the first object and the front and right faces of the second object, where the front face of the second object is seen without blurring or distortion.

Figure 9F:
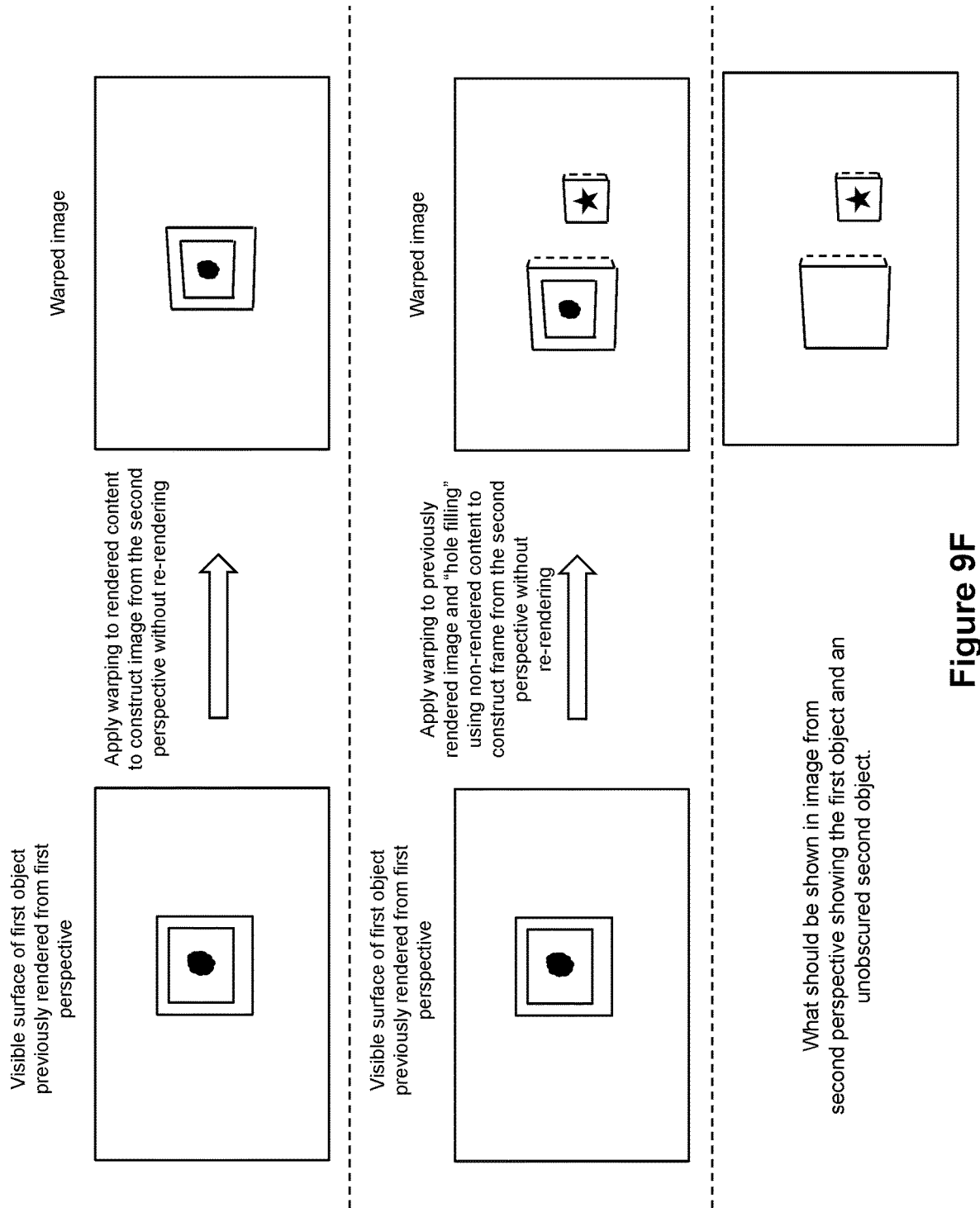

As shown in FIG. 9F, warping may be used to change the previous frame from the first perspective so that it is shown from the second perspective. This approach takes the rendered content of the image of the previous frame from the first perspective, and shifts the way that the rendered content is presented in an attempt to display the rendered content from the second. In this example, the previous frame was generated from the first perspective, which means that the rendered content includes image data corresponding to visible surfaces of the first and second objects(e.g., the front surface of the first object containing a blurred or distorted version of the front face of the second object) and does not include image data corresponding to non-visible surfaces of the first and second objects (e.g., all faces of the first object except for the front face and all faces of the second object in a non-blurred or non-distorted manner). Therefore, even if warping is applied, all faces of the first object except for the front face including the blurred or distorted version of the front face of the second object, and all faces of the second object in a non-blurred or non-distorted manner will not exist in the warped image. This creates a number of artifacts that affect the usability and accuracy of the new frame.

The problem is illustrated in FIG. 9F, where warping is applied to the previous frame from the first perspective to construct the new frame from the second perspective without regenerating. This causes an inaccurate display from the second perspective. There are two things potentially problematic with using this approach. First, the first object should not include a blurred or distorted version of the front face of the second object. Second, the second object (i.e., a non-blurred or non-distorted version of the second object) is completely missing from the warped image. Contrast the frame generated at the top of FIG. 9F with the frame of what should have been shown from the second perspective in the bottom of FIG. 9F. The bottom of FIG. 9F shows the first object and an unobstructed view of the second object with no transparency of the first object and no blurring or distortion of the second object applied.

The middle of FIG. 9F shows one possible solution to the problem shown at the top of FIG. 9F. In some embodiments, the rendered content and the non-rendered content from the previous frame are kept/stored. Warping is applied to the rendered content and any "holes" of the warped rendered content may be "filled in" using the rendered content and/or the non-rendered content. However, this has some disadvantages. Warping the rendered content and then filling in the holes using the rendered content and/or the non-rendered content may result in unintended artifacts. For example, because the rendered content includes the blurred or distorted version of the front face of the second object, the warped rendered content also includes the blurred or distorted version of the front face of the second object, and using the rendered content and/or non-rendered content to fill in the holes of the warped rendered content simply adds a non-blurred or non-distorted version of the second object (both front and right faces of the second object), however, it does not remove the blurred or distorted version of the front face of the second object in the warped rendered content. Therefore, it may not be desirable to warp rendered content from a previous frame and fill in holes of the warped content using the rendered content and/or non-rendered content from the previous frame.

The disclosure will now describe an approach that resolves the problematic results from the alternative approach described in FIGS. 9A-9F. FIGS. 10 and 11A-11G describe a solution to resolve the warping issue presented in FIGS. 9A-9F by keeping/storing data separately for semi-transparent objects and opaque objects. Keeping/storing the data separately also helps determine what objects should be and should not be affected by the semi-transparent object.

Figure 10:
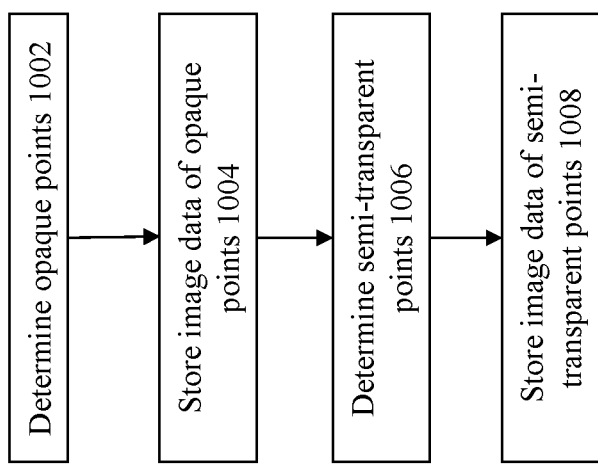
FIG. 10 shows a flowchart for an approach for selecting and storing image data corresponding to opaque objects and semi-transparent objects, according to one embodiment.

FIG. 10 shows a flowchart of an approach for storing content corresponding to semi-transparent objects and opaque objects, according to one embodiment. In this approach, the application will store semi-transparent points corresponding to semi-transparent objects and opaque points corresponding to opaque objects.

At 1002, the application determines opaque points of an opaque object from a first perspective. Image data corresponding to the opaque points describes the opaque points with no blurring or distortion applied. When the user moves to a different position (e.g., one where the opaque points of the opaque object can be viewed without viewing the opaque points through a semi-transparent surface of a semi-transparent object), the application will have enough information and detail about the opaque object to construct the opaque object from a different perspective.

At 1004, the image data corresponding to opaque points is stored. The image data corresponding to the opaque points can be stored in any type of data structure. As noted above, the image data may be stored as a linked list, a voxel, surface definitions (e.g., shells, curves, and the like), N-dimensional data structures or graph representation thereof, and the like. In some embodiments, the application can also determine a granularity of image data that will be stored.

At 1006, the application determines semi-transparent points of a semi-transparent object. A semi-transparent object may be, for example, fog, smoke, or a "frosted glass." If the semi-transparent object is in front of an opaque object, this causes the opaque object to be viewable through the semi-transparent object. When the opaque object is viewed through the semi-transparent object, the opaque object will appear blurred or distorted due to the view of the opaque object being affected by the semi-transparent, such as, for example, by the semi-transparent material of the semi-transparent object. Image data corresponding to the semi-transparent points describes the semi-transparent points with no blurring or distortion applied. When the user moves to a different position (e.g., one where the semi-transparent points of the semi-transparent object can be viewed without viewing opaque points of an opaque object through the semi-transparent surface of the semi-transparent object), the application will have enough information and detail about the semi-transparent object to construct the semi-transparent object from a different perspective.

At 1008, image data corresponding to the semi-transparent points is stored in. The image data corresponding to the semi-transparent points is stored to handle transparency correctly when generating a different perspective (e.g., a second perspective) from the first perspective. As noted above, the image data may be stored as a linked list, a voxel, surface definitions (e.g., shells, curves, and the like), N-dimensional data structures or graph representation thereof, and the like. In some embodiments, the application can also determine a granularity of image data that will be stored.

FIGS. 11A-11G illustrate an example approach for displaying a second perspective of a frame using image data corresponding to opaque points and semi-transparent points from a first perspective, according to one embodiment. The image data includes rendered content and non-rendered content.

Figure 11A:
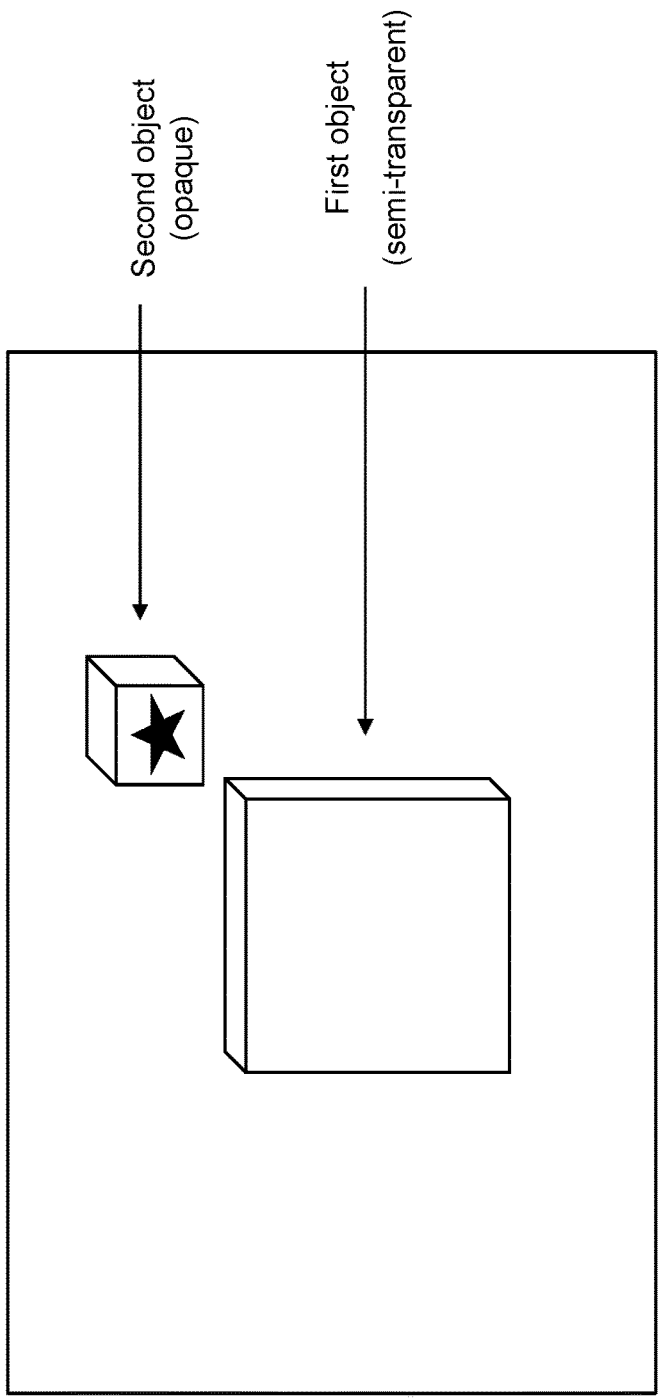
FIGS. 11A-11G show displaying a second perspective of an image using image data corresponding to opaque and semi-transparent points, according to another embodiment.
Figure 11A:
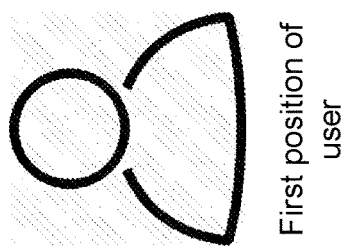
Figure 11B:
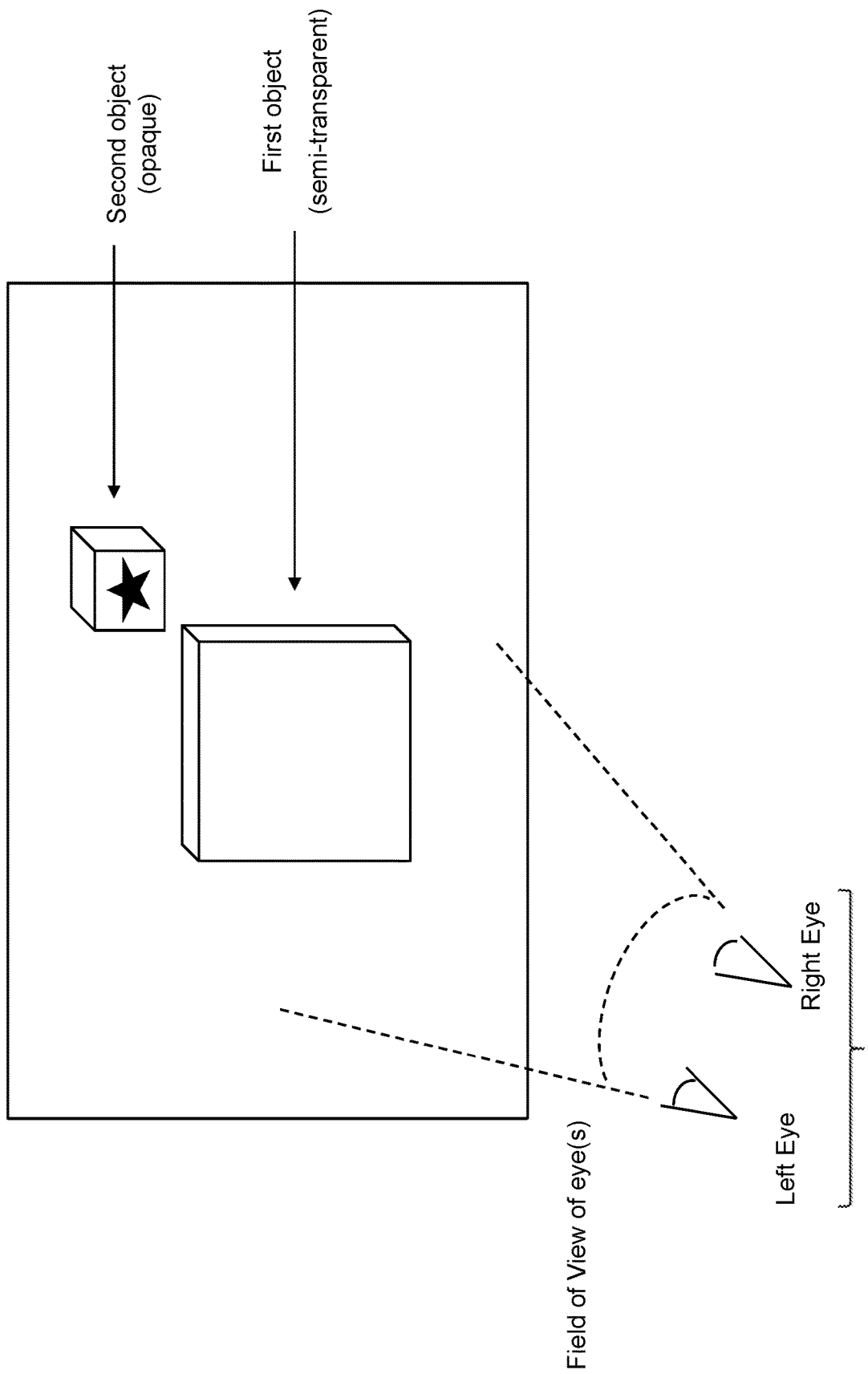
Figure 11C:
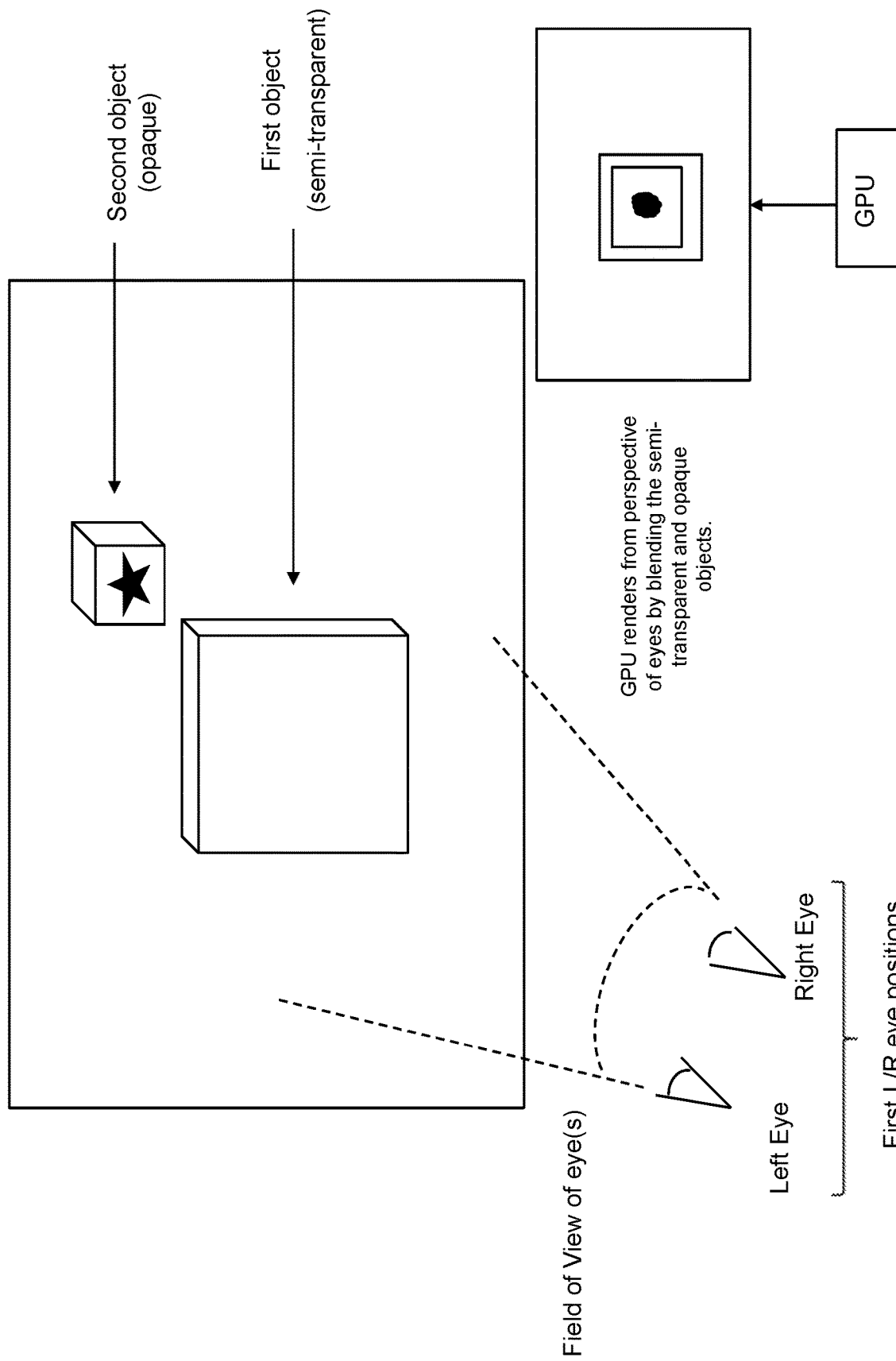

FIGS. 11A-11C show the same image setup as in FIGS. 9A-9C, where the user is at a first location and where the particular location and angular position of the eyes of the user is referred to as a first perspective. The user, the first object (semi-transparent object) and the second object (opaque object) are in the same initial position. In FIG. 11C, a GPU (e.g., the GPU 152) renders a frame including an image of a scene from a first perspective that is the same as that of FIG. 9C. The frame from the first perspective shows the front face of the second object as being viewed through the front face of the first object such that the front face of the second object appears blurred or distorted. FIGS. 11E-11F shows the same image setup as FIGS. 9D-9E where the user is at a second location and where the particular location and angular position of the eyes of the user at the second position is referred to as a second perspective.

Figure 11D:
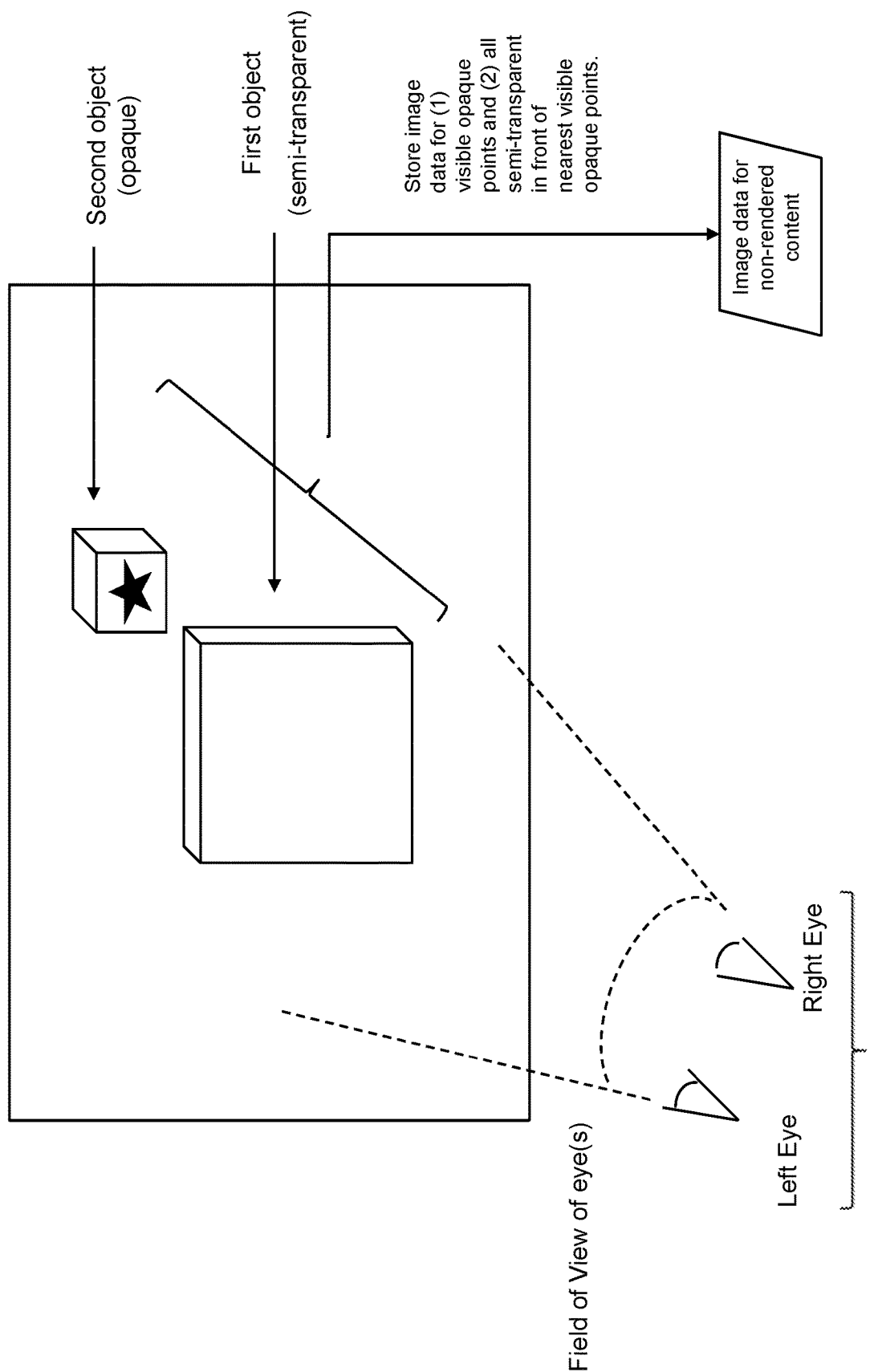
Figure 11E:
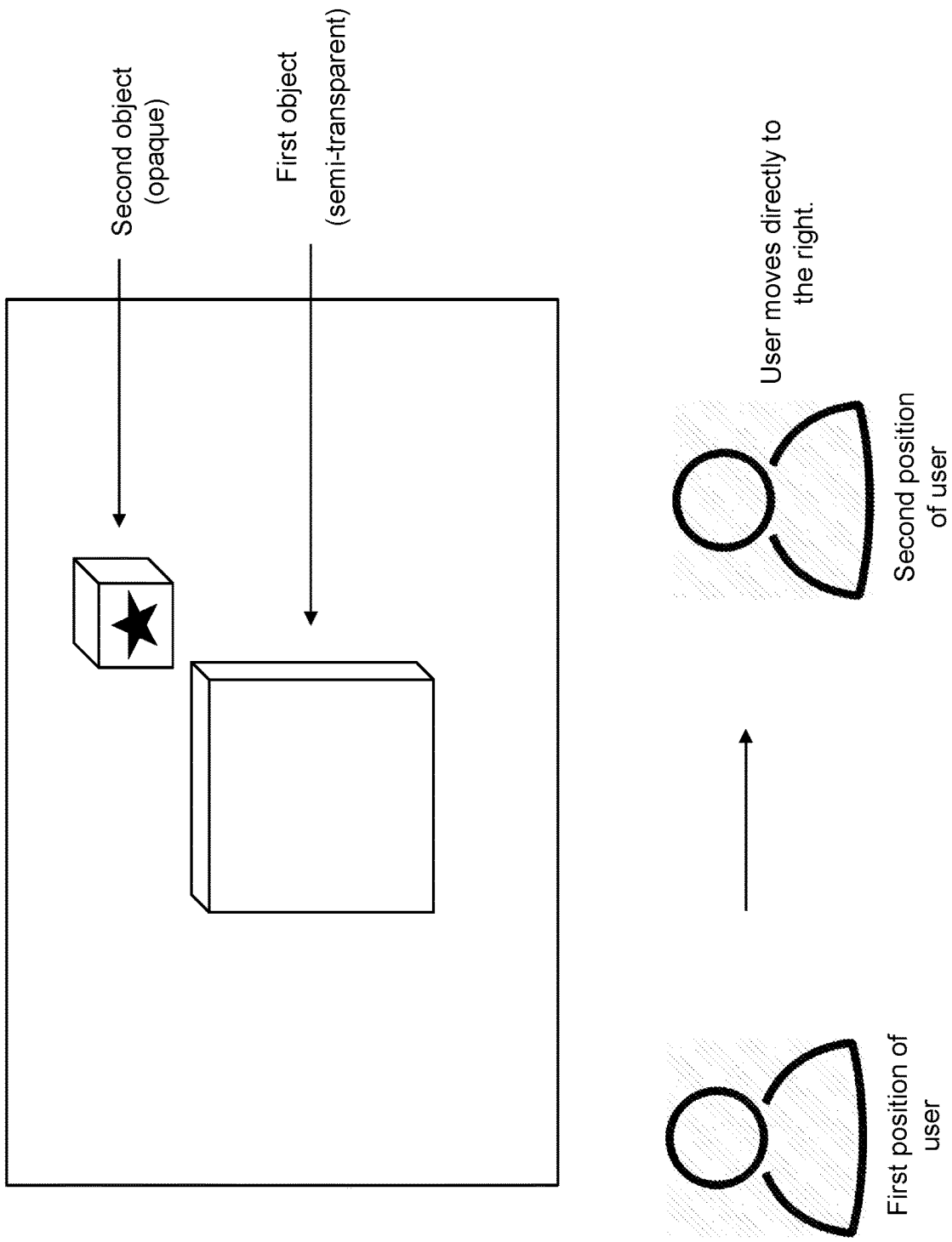
Figure 11F:
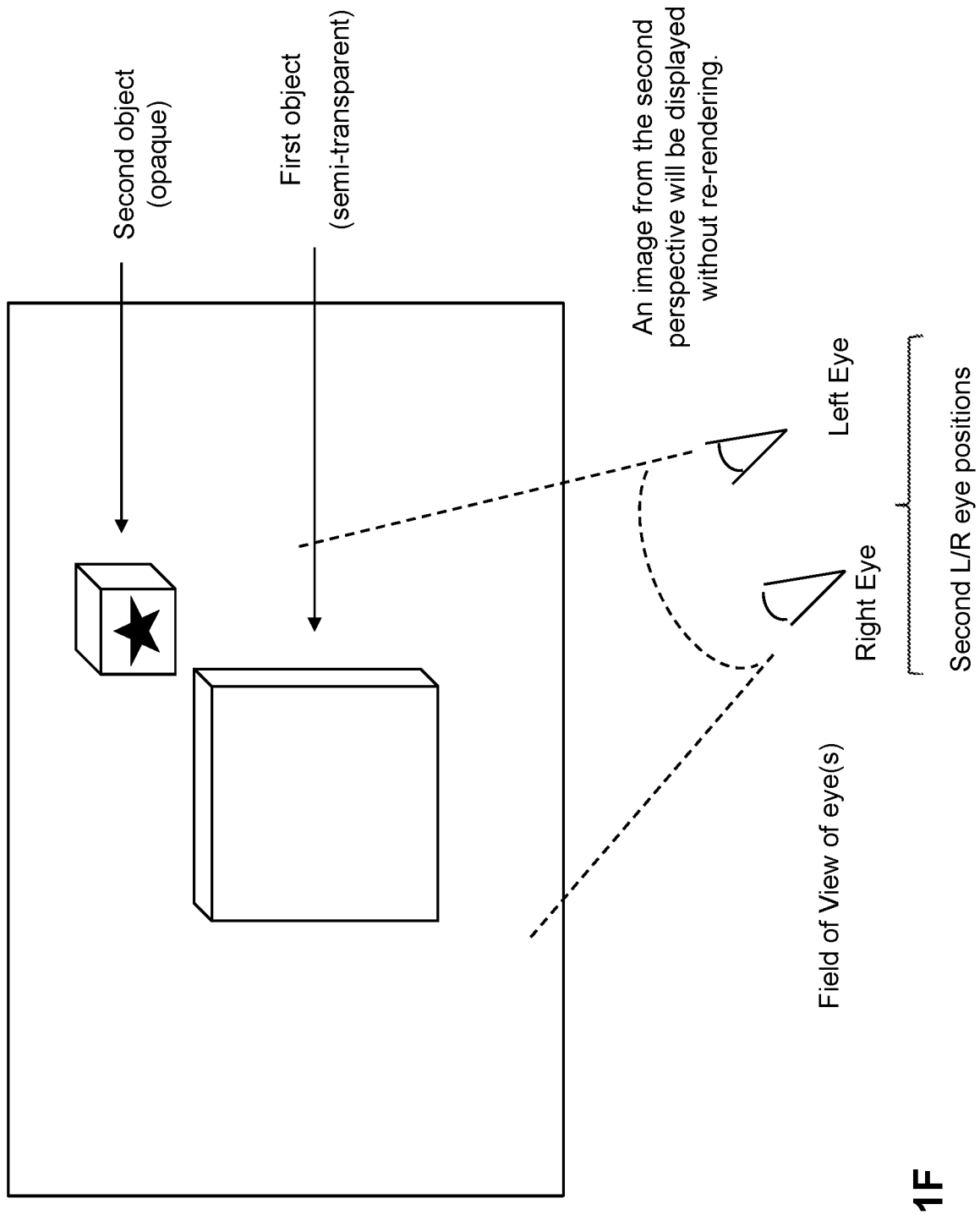

In FIG. 11D, the application selects and stores non-rendered content corresponding to (1) opaque points of the second object and (2) semi-transparent points of the first object. The application stores the opaque points of the second object along with their respective depth information, and the semi-transparent points of the first object along with their respective depth information. In some embodiments, there may be an upper bound to the number of semi-transparent points and/or the opaque points to be stored to alleviate storage memory concerns. The non-rendered content will be used to handle transparency in any additional perspective. In some embodiments, the non-rendered content is used in addition to the frame from the first perspective. Now, when a user moves to a different perspective (e.g., from the first perspective to the second perspective), the application can use the non-rendered content to construct the new frame from the new perspective.

In some embodiments, the image data (for the rendered content and/or the non-rendered content) includes volumetric and depth information. Furthermore, the image data can include reference data which contains information to determine whether opaque objects are affected by semi-transparent objects and vice versa. The application contains logic to determine any opaque objects that are affected by semi-transparent objects and vice versa because the image data for opaque and transparent objects have been maintained separately.

As shown in FIG. 11E, the user moves to a second position directly to the right of the first position. At this point, the user will be looking at the first and second objects from a different position as compared to the first position. The eyes of the user may be located at the second perspective shown in FIG. 11F. In the second perspective, the eyes of the user should see a frame that is different than the frame from the first perspective. In the second perspective, the eyes of the user should be seeing both the front and right faces of the first object and the front and right faces of the second object. Specifically, the user will now see the star on the front face of the second object without any blurring or distortion from the first object.

Figure 11G:
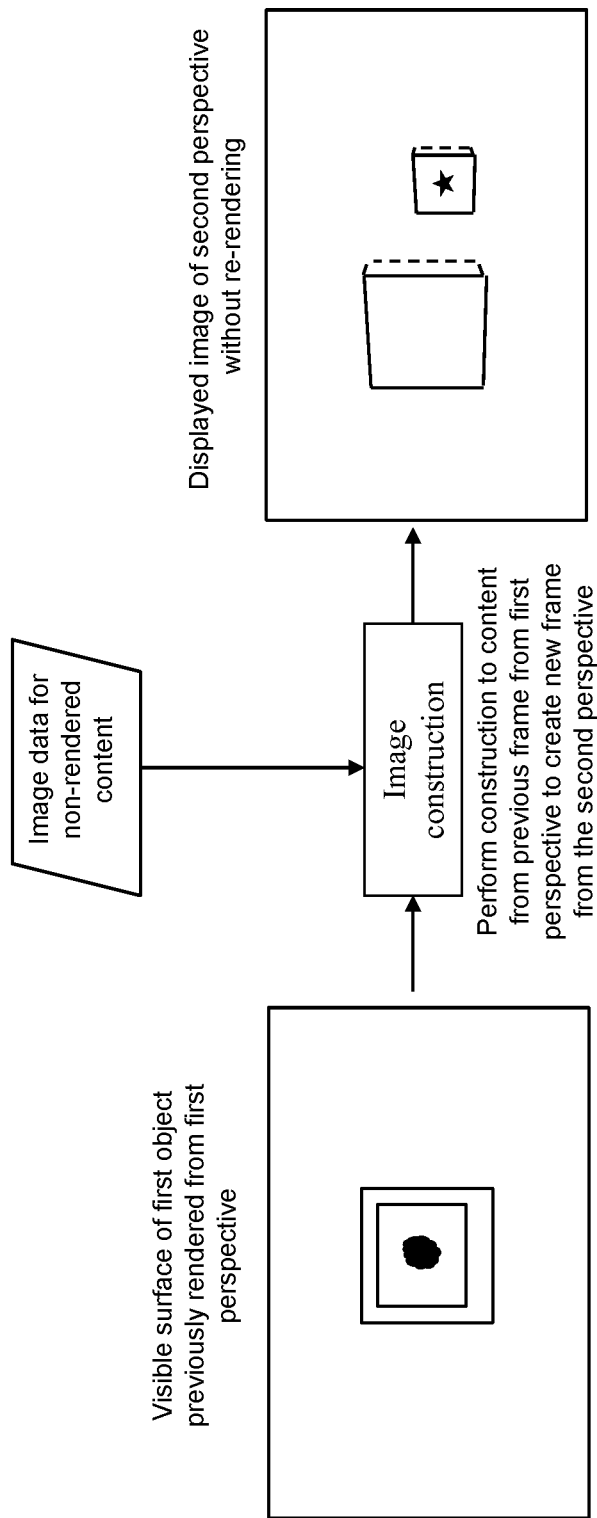

As shown in FIG. 11G, construction may be applied to the content from the previous frame including the rendered frame from the first perspective and the non-rendered content from the first perspective to create a new frame from the second perspective without entirely regenerating the whole scene. The application will first identify which of the non-rendered content (e.g., the right face of the first object and the front and right surface of the second object) is visible from the second perspective. The application then applies a construction to the stored image data for (1) opaque points and (2) the semi-transparent points to generate a frame from the second perspective without performing a completely regenerating of the second perspective. As noted above, the disocclusion problem no longer exists because the application has preserved image data for non-rendered content that was used during construction.

System Architecture Overview

Figure 12:
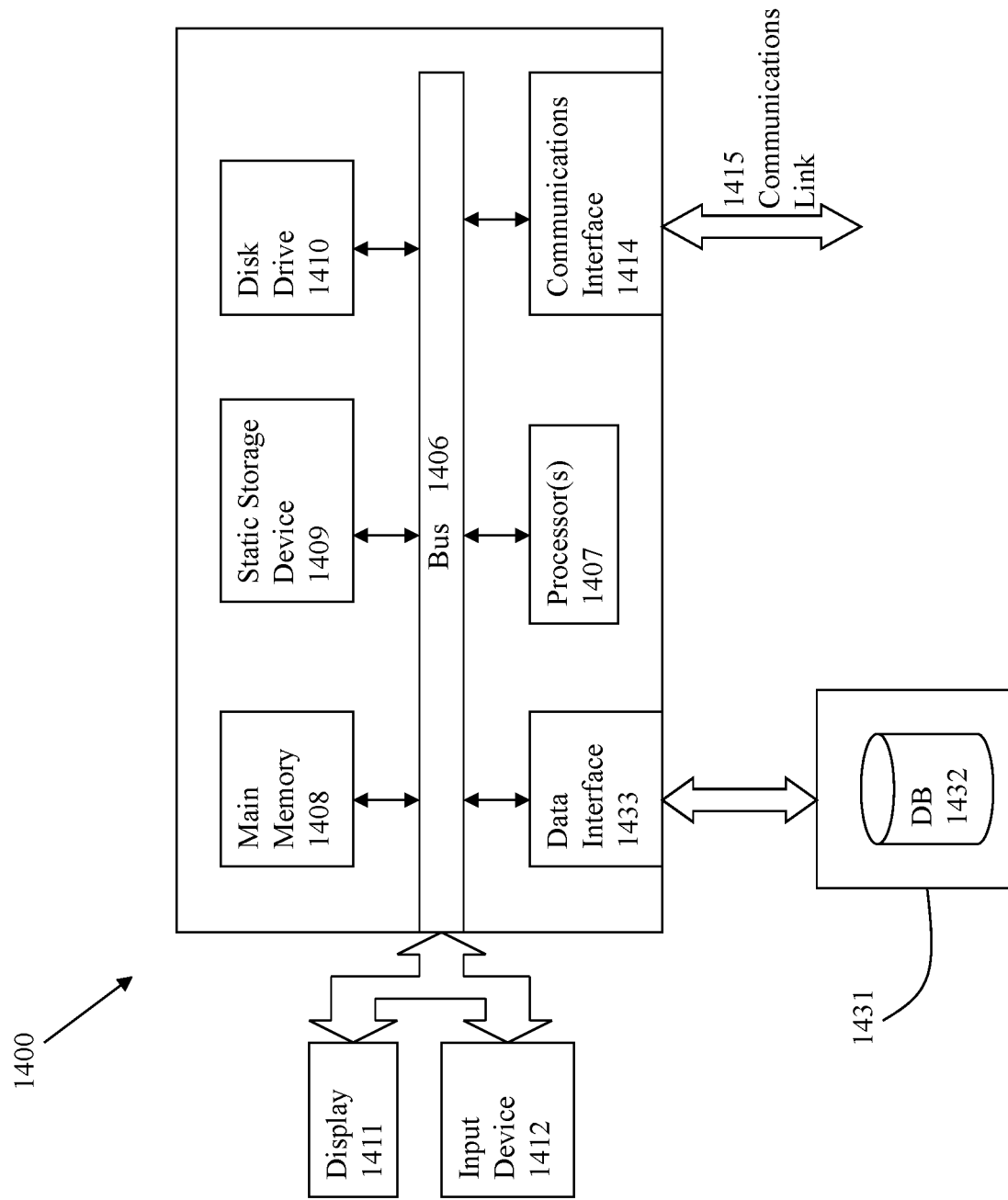
FIG. 12 shows a computerized system on which an embodiment of the disclosure can be implemented.

FIG. 12 is a block diagram of an illustrative computing system 1400 suitable for implementing one or more of the embodiments of the present disclosure. The computing system 1400 includes a bus 1406 or other communication mechanism for communicating information, which interconnects subsystems and devices, such as a processor 1407, a main memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard), and cursor control.

According to one embodiment, the computing system 1400 performs specific operations by the processor 1407 executing one or more sequences of one or more instructions contained in the main memory 1408. Such instructions may be read into the main memory 1408 from another computer readable/usable medium, such as the static storage device 1409 or the disk drive 1410. In alternative embodiments, hard-wired circuitry may be used in place of or in combination with software instructions to implement the disclosure. Thus, embodiments are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the main memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In one embodiment, execution of the sequences of instructions to practice the disclosure is performed by a single computing system 1400. According to other embodiments, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program, e.g., application code, through the communications link 1415 via the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for constructing a new frame using rendered content and non-rendered content from a first perspective, the method comprising:
    rendering visible surfaces of a first set of objects from the first perspective;
    storing both the rendered content and the non-rendered content from the first perspective, the rendered content corresponding to the visible surfaces of the first set of objects from the first perspective, and the non-rendered content corresponding to non-visible portions of the first set of objects from the first perspective; and
    generating a new frame to be displayed, wherein the new frame is generated from a second perspective using the rendered content and the non-rendered content from the first perspective.

2. The method of claim 1, further comprising identifying the first perspective by capturing a first pose of a user.

3. The method of claim 1, wherein storing both the rendered content and the non-rendered content from the first perspective comprises storing both the rendered content and the non-rendered content in at least one of linked lists, array structures, true volumetric representations, voxels, surface definitions, N-dimensional data structures, and N-dimensional graph representations.

4. The method of claim 1, further comprising determining different granularities for both the rendered content and the non-rendered content for the one or more objects from the first perspective.

5. The method of claim 1, further comprising:
    rendering visible surfaces of a second set of objects from the second perspective;
    warping at least some of the stored rendered content from the first perspective to the second perspective;
    wherein the new frame is generated from the second perspective by combining new rendered content and warped rendered content, the new rendered content corresponding to the visible surfaces of the second set of objects from the second perspective, and the warped rendered content corresponding to the stored rendered content warped from the first perspective to the second perspective.

6. The method of claim 5, wherein rendering the visible surfaces of the second set of objects from the second perspective comprises:
    determining a third set of objects visible from the second perspective;
    comparing the third set of objects from the second perspective to the stored rendered content from the first perspective to identify the second set of objects, wherein the second set of objects includes objects from the third set of objects that are not in the stored rendered content; and
    rendering the visible surfaces of the second set of objects from the second perspective.

7. The method of claim 5, wherein warping the at least some of the stored content from the first perspective to the second perspective comprises:
    determining a third set of objects visible from the second perspective;
    comparing the third set of objects from the second perspective to the stored rendered content from the first perspective to identify objects that are in both the third set of objects and the stored rendered content;
    warping the objects that are in both the third set of objects and the stored rendered content from the first perspective to the second perspective.

8. The method of claim 1, wherein storing both the rendered content and the non-rendered content from the first perspective comprises:
    identifying the rendered content and the non-rendered content from the first perspective;
    analyzing the rendered content and the non-rendered content to determine if content corresponds to one of a surface point and a non-surface point;
    discarding the content corresponding to a non-surface point; and
    storing the content corresponding to the surface point.

9. The method of claim 1, wherein storing both the rendered content and the non-rendered content from the first perspective comprises:
predicting a head movement of a user;
calculating bounds for the predicted head movement of the user based at least in part on one or more of a predicted direction, a current speed of movement of the user, and a predicted speed of movement for the user, the bounds corresponding to a maximum predicted head movement for the second perspective;
determining rendered content and non-rendered content within the calculated bounds for the predicted head movement; and
storing the rendered content and the non-rendered content within the calculated bounds.

10. The method of claim 1, wherein storing both the rendered content and the non-rendered content for the one or more objects from the first perspective further comprises:
determining opaque points of one or more opaque objects;
storing image data corresponding to the opaque points;
determining semi-transparent points of one or more semi-transparent objects; and
storing image data of the semi-transparent points,
wherein the first set of objects comprises the one or more opaque objects and the one or more semi-transparent objects.

11. A system for constructing a new frame using rendered content and non-rendered content from a first perspective, the system comprising:
a non-transitory computer-readable storage medium storing executable computer instructions that, when executed, perform steps comprising:
rendering visible surfaces of a first set of objects from the first perspective;
storing both the rendered content and the non-rendered content from the first perspective, the rendered content corresponding to the visible surfaces of the first set of objects from the first perspective, and the non-rendered content corresponding to non-visible portions of the first set of objects from the first perspective; and
generating a new frame to be displayed, wherein the new frame is generated from a second perspective using the rendered content and the non-rendered content from the first perspective; and
a processor configured to execute the computer instructions.

12. The system of claim 11, wherein the instructions, when executed, perform further steps comprising identifying the first perspective by capturing a first pose of a user.

13. The system of claim 11, wherein storing both the rendered content and the non-rendered content from the first perspective comprises storing both the rendered content and the non-rendered content in at least one of linked lists, array structures, true volumetric representations, voxels, surface definitions, N-dimensional data structures, and N-dimensional graph representations.

14. The system of claim 11, wherein the instructions, when executed, perform further steps comprising determining different granularities for both the rendered content and the non-rendered content for the one or more objects from the first perspective.

15. The system of claim 11, wherein the instructions, when executed, perform further steps comprising:
rendering visible surfaces of a second set of objects from the second perspective;
warping at least some of the stored rendered content from the first perspective to the second perspective;
wherein the new frame is generated from the second perspective by combining new rendered content and warped rendered content, the new rendered content corresponding to the visible surfaces of the second set of objects from the second perspective, and the warped rendered content corresponding to the stored rendered content warped from the first perspective to the second perspective.

16. The system of claim 15, rendering the visible surfaces of the second set of objects from the second perspective comprises:
determining a third set of objects visible from the second perspective;
comparing the third set of objects from the second perspective to the stored rendered content from the first perspective to identify the second set of objects, wherein the second set of objects includes objects from the third set of objects that are not in the stored rendered content; and
rendering the visible surfaces of the second set of objects from the second perspective.

17. The system of claim 15, wherein warping the at least some of the stored content from the first perspective to the second perspective comprises:
determining a third set of objects visible from the second perspective;
comparing the third set of objects from the second perspective to the stored rendered content from the first perspective to identify objects that are in both the third set of objects and the stored rendered content;
warping the objects that are in both the third set of objects and the stored rendered content from the first perspective to the second perspective.

18. The system of claim 11, wherein storing both the rendered content and the non-rendered content from the first perspective comprises:
identifying the rendered content and the non-rendered content from the first perspective;
analyzing the rendered content and the non-rendered content to determine if content corresponds to one of a surface point and a non-surface point;
discarding the content corresponding to a non-surface point; and
storing the content corresponding to the surface point.

19. The system of claim 11, wherein storing both the rendered content and the non-rendered content from the first perspective comprises:
predicting a head movement of a user;
calculating bounds for the predicted head movement of the user based at least in part on one or more of a predicted direction, a current speed of movement of the user, and a predicted speed of movement for the user, the bounds corresponding to a maximum predicted head movement for the second perspective;
determining rendered content and non-rendered content within the calculated bounds for the predicted head movement; and
storing the rendered content and the non-rendered content within the calculated bounds.

20. The system of claim 11, wherein storing both the rendered content and the non-rendered content for the one or more objects from the first perspective further comprises:
determining opaque points of one or more opaque objects;
storing image data corresponding to the opaque points;
determining semi-transparent points of one or more semi-transparent objects; and storing image data of the semi-transparent points, wherein the first set of objects comprises the one or more opaque objects and the one or more semi-transparent objects.

21. A computer program product embodied in a non-transitory computer readable medium, the computer readable medium having stored thereon a sequence of instructions which, when executed by a processor causes the processor to execute a method for constructing a new frame using rendered content and non-rendered content from a first perspective, the method comprising:

rendering visible surfaces of a first set of objects from the first perspective;

storing both the rendered content and the non-rendered content from the first perspective, the rendered content corresponding to the visible surfaces of the first set of objects from the first perspective, and the non-rendered content corresponding to non-visible portions of the first set of objects from the first perspective; and generating a new frame to be displayed, wherein the new frame is generated from a second perspective using the rendered content and the non-rendered content from the first perspective.

\* \* \* \* \*